United States Patent
Sakurai

(10) Patent No.: US 8,432,447 B2
(45) Date of Patent: Apr. 30, 2013

(54) STRIPE PATTERN DETECTION SYSTEM, STRIPE PATTERN DETECTION METHOD, AND PROGRAM FOR STRIPE PATTERN DETECTION

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 464 days.

(21) Appl. No.: 12/920,437

(22) PCT Filed: Mar. 18, 2009

(86) PCT No.: PCT/JP2009/055334
§ 371 (c)(1),
(2), (4) Date: Aug. 31, 2010

(87) PCT Pub. No.: WO2009/116590
PCT Pub. Date: Sep. 24, 2009

(65) Prior Publication Data
US 2011/0007163 A1    Jan. 13, 2011

(30) Foreign Application Priority Data
Mar. 19, 2008  (JP) ................................. 2008-071909

(51) Int. Cl.
*H04N 5/232*    (2006.01)
(52) U.S. Cl.
USPC ............ 348/148; 348/118; 348/135; 382/181

(58) Field of Classification Search .......... 348/118–148; 701/117–532; 382/100–291
See application file for complete search history.

(56) References Cited

U.S. PATENT DOCUMENTS

| | | | | |
|---|---|---|---|---|
| 7,308,139 B2 * | 12/2007 | Wentland et al. | ............. | 382/181 |
| 2009/0088978 A1 * | 4/2009 | Ishikawa et al. | ............. | 701/223 |
| 2009/0122136 A1 * | 5/2009 | Shiraishi et al. | ............. | 348/135 |
| 2010/0079590 A1 * | 4/2010 | Kuehnle et al. | ............. | 348/118 |
| 2011/0216194 A1 * | 9/2011 | Kosaki | ............. | 348/148 |

FOREIGN PATENT DOCUMENTS

| JP | 8-315296 A | 11/1996 |
|---|---|---|
| JP | 2007-153031 A | 6/2007 |

OTHER PUBLICATIONS

Patent_google_history search.pdf.*
ProQuest_NPL_history search.pdf.*
Attitude information deduction based on single frame or blurred star image.pdf.*

* cited by examiner

*Primary Examiner* — William C Vaughn, Jr.
*Assistant Examiner* — Luis M Perez
(74) *Attorney, Agent, or Firm* — Sughrue Mion, PLLC

(57) ABSTRACT

Disclosed is a detection system including a stripe pattern foreground filtering unit, a stripe pattern background filtering unit, a stripe pattern integration filtering unit, an isolated feature point removal unit, a stripe pattern area detection unit and a stripe pattern area outputting unit. The detection system utilizes a stripe pattern area filter value that directly exploits the shape of the stripe pattern in the local processing of each pixel in an image to detect the stripe pattern area.

41 Claims, 15 Drawing Sheets

STRIPE PATTERN DETECTION SYSTEM, STRIPE PATTERN DETECTION METHOD, AND PROGRAM FOR STRIPE PATTERN DETECTION

REFERENCE TO RELATED APPLICATION

The present invention is based upon and claims the benefit of the priority of Japanese patent application No. 2008-071909, filed on Mar. 19, 2008, the disclosure of which is incorporated herein in its entirety by reference thereto.

TECHNICAL FIELD

This invention relates to a method, a system and a program for detecting a stripe pattern. More particularly, it relates to a method, a system and a program for detecting a stripe pattern with the high detection performance despite the lower processing volume.

BACKGROUND ART

As a related technique for detecting a stripe pattern, there is disclosed in Patent Document 1, for example, a configuration for detecting a zebra zone, drawn on a road surface, from an image acquired by a camera mounted on a vehicle. FIG. 15 shows an example configuration of a stripe pattern detection system. This stripe pattern detection system includes an image input device 1510, a bird's-eye image forming means 1501, a template storage means 1502, a template read means 1503, a template matching means 1504 and stripe pattern detection means 1505. FIG. 15 is newly drawn for the present description as a new block diagram for illustrating the function of a back monitor computer of Patent Document 1. This stripe pattern detection system operates as follows:

The image input device 1510 inputs the image which is a subject of zebra zone detection acquired by a camera mounted on a vehicle.

The bird's-eye image forming means 1501 forms a bird's-eye image by converting the image acquired by the camera mounted on a vehicle so as to command a bird's-eye view of the road surface from a virtual viewing point located above the real world.

The template read means 1503 then reads a template of a zebra zone pattern that is estimated to exist in the vicinity of an own vehicle at a current time among templates representing patterns of zebra zones stored beforehand in the template storage means 1502.

The template matching means 1504 then matches the template of the zebra zone pattern to the bird's-eye image at each position within a certain range of the bird's-eye image.

In case the degree of coincidence between the template and the bird's-eye image is of a maximum value, and there is a location or locations where the degree of coincidence exceeds a preset threshold value, the stripe pattern detection means 1505 concludes that the zebra zone has been detected at the location of the bird's-eye image.

Such a template indicating a pattern specific to each zebra zone site present on a map is stored in the template storage means 1502 as a pre-stored template of a zebra zone pattern.
Patent Document 1:
JP Patent Kokai Publication No. JP-P2007-153031A

SUMMARY

The entire disclosure of the above Patent Document 1 is incorporated herein by reference thereto.

The following is an analysis of the related art technique by the present invention.

The configuration shown in FIG. 15 has a problem that the amount of processing is large. The reason is that the configuration is based on the fact that the processing of template matching, which involves area calculations, is repeatedly carried out at each position of the subject image.

It is therefore an object of the present invention to provide a method, a system and a program for detecting a stripe pattern that is able to exhibit high detection performance with a low processing amount.

The invention may be summarized substantially as follows, though not limited thereto:

A system for detecting a stripe pattern in accordance with one aspect of the present invention includes:

a stripe pattern foreground filter unit that finds, for each pixel in an image, a maximum value out of feature values, each representing an increment of a pixel value in a surrounding area of each pixel from pixel values outside of the surrounding area, as a size of the surrounding area is changed, and allots the maximum value as a stripe pattern foreground filter value, while allotting the size of the surrounding area that will give the maximum value as being a stripe pattern foreground width, a stripe pattern background filter unit that finds, for each pixel in the image, a maximum value out of feature values, each representing a decrement of a pixel value in a surrounding area of each pixel from pixel values outside of the surrounding area, as the size of the surrounding area is changed, and allots the maximum value as a stripe pattern background filter value, while allotting the size of the surrounding area that will give the maximum value as being a stripe pattern background width.

a stripe pattern integration filter unit that calculates and allots a stripe pattern integration filter value at each pixel in the image, based on the stripe pattern foreground filter value in each pixel;

the stripe pattern background filter value at a stripe pattern foreground end pixel that gives a maximum value out of the stripe pattern background filter values in the surrounding area of a pixel spaced apart from each pixel by a distance corresponding to the stripe pattern foreground width at each pixel; and the stripe pattern foreground filter value at a stripe pattern background end pixel that gives a maximum value out of the stripe pattern foreground filter values in the surrounding area of a pixel spaced apart from the stripe pattern foreground end pixel by a distance corresponding to the stripe pattern background width at the stripe pattern foreground end pixel, and a stripe pattern area detection unit that decides, for each area in the image, whether or not a stripe pattern is contained in each area, from a feature value calculated from the stripe pattern integration filter value in each area, and outputs the position information regarding the area containing the stripe pattern as the stripe pattern area information.

A method for detecting a stripe pattern in accordance with another aspect of the present invention includes:

finding, for each pixel in an image, a maximum value out of feature values, each representing an increment of a pixel value in a surrounding area of each pixel from pixel values outside of the surrounding area, as the size of the surrounding area is changed, allotting the maximum value as a stripe pattern foreground filter value and allotting the size of the surrounding area that will give the maximum value as being a stripe pattern foreground width;

finding, for each pixel in the image, a maximum value out of feature values, each representing a decrement of a pixel value in a surrounding area of each pixel from pixel values outside of the surrounding area, as the size of the surrounding area is changed, allotting the maximum value as a stripe pattern background filter value, and allotting the size of the surrounding area that will give the maximum value as being a stripe pattern background width;

calculating and allotting a stripe pattern integration filter value at each pixel in the image, based on the stripe pattern foreground filter value in each pixel, the stripe pattern background filter value at a stripe pattern foreground end pixel that gives a maximum value out of the stripe pattern background filter values in the surrounding area of a pixel spaced apart from each pixel by a distance corresponding to the stripe pattern foreground width at each pixel, and the stripe pattern foreground filter value at a stripe pattern background end pixel that gives a maximum value out of the stripe pattern foreground filter values in the surrounding area of a pixel spaced apart from the stripe pattern foreground end pixel by a distance corresponding to the stripe pattern background width at the stripe pattern foreground end pixel; and deciding, for each area in the image, whether or not a stripe pattern is contained in each area, from a feature value calculated from the stripe pattern integration filter value in each area to output the position information regarding the area containing the stripe pattern as the stripe pattern area information.

A program in accordance with a further aspect of the present invention causes a computer to execute:

a stripe pattern foreground filtering processing of finding, for each pixel in an image, a maximum value out of feature values, each representing an increment of a pixel value in a surrounding area of each pixel from pixel values outside of the surrounding area, as the size of the surrounding area is changed, allotting the maximum value as a stripe pattern foreground filter value, and allotting the size of the surrounding area that will give the maximum value as being a stripe pattern foreground width;

a stripe pattern background filtering processing of finding, for each pixel in the image, a maximum value out of feature value, each representing a decrement of a pixel value in a surrounding area of each pixel from pixel values outside of the surrounding area, as the size of the surrounding area is changed, allotting the maximum value as a stripe pattern background filter value and allotting the size of the surrounding area that will give the maximum value as being a stripe pattern background width;

a stripe pattern integration filtering processing of calculating and allotting a stripe pattern integration filter value at each pixel in the image, based on a stripe pattern foreground filter value in each pixel, on the stripe pattern background filter value at a stripe pattern foreground end pixel that gives a maximum value out of the stripe pattern background filter values in the surrounding area of a pixel spaced apart from each pixel by a distance corresponding to the stripe pattern foreground width at each pixel, and the stripe pattern foreground filter value at a stripe pattern background end pixel that gives a maximum value out of the stripe pattern foreground filter values in the surrounding area of a pixel spaced apart from the stripe pattern foreground end pixel by a distance corresponding to the stripe pattern background width at the stripe pattern foreground end pixel; and a stripe pattern detection processing of deciding, for each area in the image, whether or not a stripe pattern is contained in each area, from a feature value calculated from the stripe pattern integration filter value in each area, to output the position information regarding the area containing the stripe pattern as the stripe pattern area information. There is also provided a computer-recording medium storing the program according to the present invention.

According to the present invention, stripe pattern detection may be accomplished with a low processing volume with the high detection performance. It is because the processing according to the present invention directly utilizes the shape of the stripe pattern based on the combination of local processing operations without the necessity of performing larger quantities of area calculations, such as template matching.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
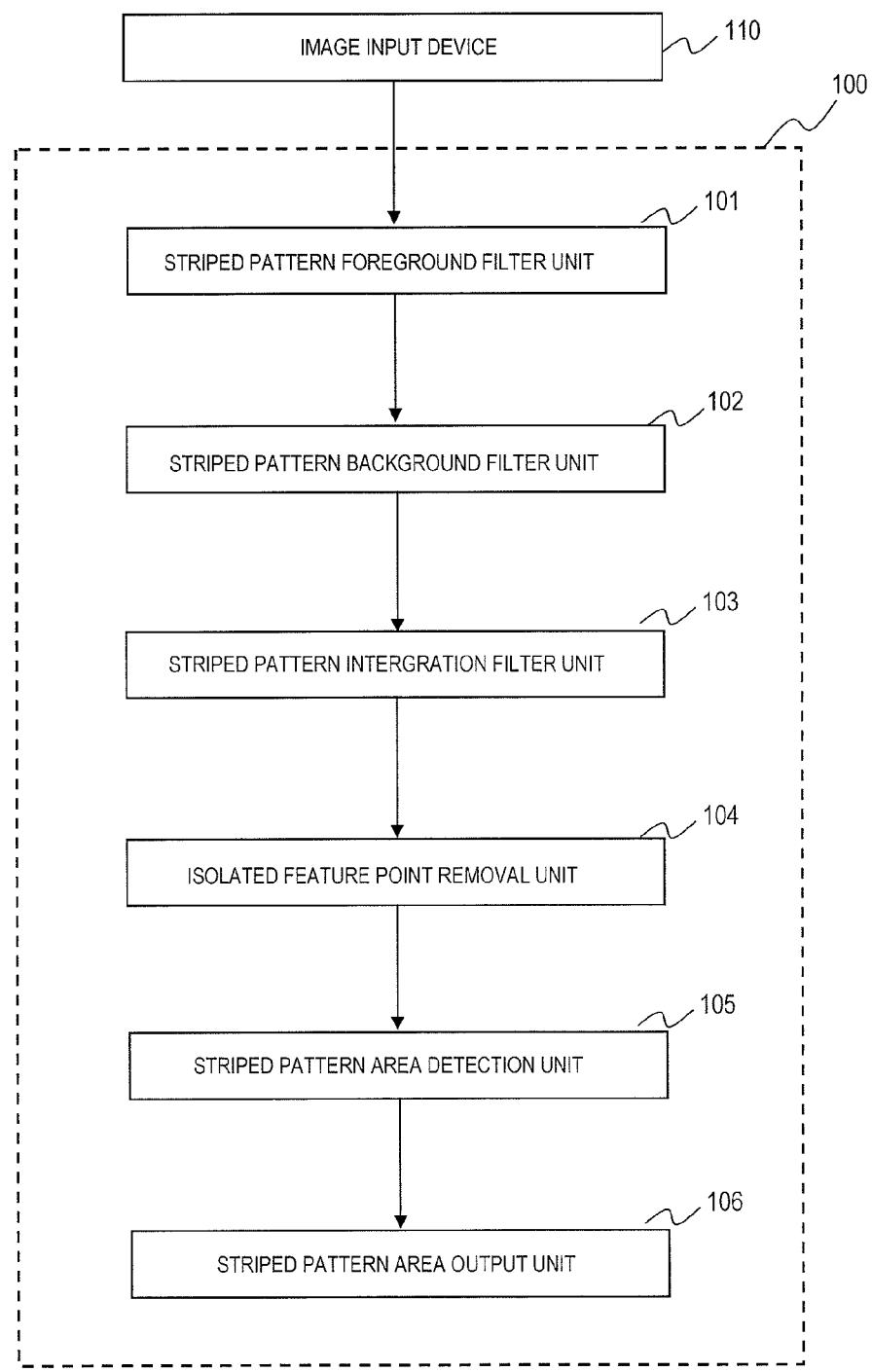
FIG. 1 is a diagram showing a configuration of a first exemplary embodiment of the present invention.

Referring to the drawings, exemplary embodiments of the present invention will be described in detail. A stripe pattern detection system according to the present invention includes a stripe pattern foreground filter unit (101), a stripe pattern background filter unit (102), a stripe pattern integration filter unit (103), an isolated feature point removal unit (104) and a stripe pattern area detection unit (105). A filter value that directly utilizes the shape of a stripe pattern in local processing of each pixel in an image is exploited to detect a stripe pattern area. With the use of this configuration, the high detection performance may be accomplished with a small processing amount by exploiting the shape of the stripe pattern and local processing with a small processing amount.

In one of modes of the present invention, the stripe pattern foreground filter unit (101) generates, for each pixel in an image, a number of feature values, each of the feature values representing an increment of a pixel value in a surrounding area of each pixel from pixel value outside of the surrounding area, as the size of the surrounding area is changed, find a maximum value out of the feature values, and sets the maximum value as a stripe pattern foreground filter value, while setting the size of the surrounding area that will give the maximum value as a stripe pattern foreground width.

In one of modes of the present invention, the stripe pattern background filter unit (102) generates, for each pixel in an image, a number of feature values, each of the feature values representing a decrement of a pixel value in a surrounding area of each pixel from pixel values outside of the surrounding area, as the size of the surrounding area is changed, finds a maximum value out of the feature values, and sets the maximum value as a stripe pattern background filter value, while setting the size of the surrounding area that will give the maximum value as a stripe pattern background width.

In one of modes of the present invention, the stripe pattern integration filter unit (103) calculates a stripe pattern integration filter value, for each pixel in the image, based on
the stripe pattern foreground filter value in each pixel,
the stripe pattern background filter value at a stripe pattern foreground end pixel that gives a maximum value out of the stripe pattern background filter values in the surrounding area of a pixel spaced apart from the pixel by a distance corresponding to the stripe pattern foreground width at each pixel, and
the stripe pattern foreground filter value at a stripe pattern background end pixel that gives a maximum value out of the stripe pattern foreground filter values in the surrounding area of a pixel spaced apart from the stripe pattern foreground end pixel by a distance corresponding to the stripe pattern background width at the stripe pattern foreground end pixel.

In one of modes of the present invention, among the pixels in a subject image having larger stripe pattern integration filter values, the isolated feature point removal unit (104) replaces the stripe pattern integration filter value in a pixel, around which there is no pixel having a larger stripe pattern integration filter value, by a smaller stripe pattern integration filter value.

In one of modes of the present invention, the stripe pattern area detection unit (105) checks, from a feature value calculated by the stripe pattern integration filter value, for each area in the image, whether or not a stripe pattern is contained in each area in the image. The stripe pattern area detection unit outputs position information regarding the area containing the stripe pattern as stripe pattern area information.

In one of modes of the present invention, the stripe pattern integration filter unit (103) calculates the stripe pattern integration filter value, based further on the stripe pattern foreground width at the pixel and the stripe pattern foreground width at the stripe pattern background end pixel.

In the stripe pattern foreground filter unit (101), the surrounding area of the pixel is an area on a vertical line whose lower end is the pixel. The size of the surrounding area is the width of an area on the vertical line.

In the stripe pattern background filter unit (102), the surrounding area of each pixel is an area on a vertical line having each pixel as the lower end. The size of the surrounding area is the width of the area on the vertical line.

In the stripe pattern integration filter unit (103), a surrounding area of a pixel spaced apart from the pixel by a distance corresponding to the stripe pattern foreground width is an area on a vertical line centered about a pixel spaced apart from each pixel by a distance corresponding to the stripe pattern foreground width. The surrounding area of each pixel spaced apart from the stripe pattern foreground end pixel by a distance corresponding to the stripe pattern background width at the stripe pattern foreground end pixel is an area on a vertical line centered about a pixel spaced apart from the stripe pattern foreground end pixel by a distance corresponding to the stripe pattern background width at the stripe pattern foreground end pixel.

In the stripe pattern foreground filter unit (101), the feature value representing an increment of a pixel value in the surrounding area of each pixel from pixel values outside of the surrounding area may be a value obtained by subtracting the sum of pixel values outside the surrounding area of each pixel from the sum of pixel values in the surrounding area.

In the stripe pattern background filter unit (102), the feature value representing a decrement of a pixel value in the surrounding area of each pixel from pixel values outside of the surrounding area may be a value obtained by subtracting the sum of pixel values in the surrounding area of each pixel from the sum of pixel values outside the surrounding area.

In the stripe pattern integration filter unit (103), the stripe pattern integration filter value may be the minimum value out of the stripe pattern foreground filter value at the pixel, the stripe pattern background filter value at the stripe pattern foreground end pixel, and the stripe pattern foreground filter value at the stripe pattern background end pixel.

In the stripe pattern integration filter unit (103), the stripe pattern integration filter value may be a value obtained by dividing the minimum value out of
the stripe pattern foreground filter value at each pixel,
the stripe pattern background filter value at the stripe pattern foreground end pixel, and
the stripe pattern foreground filter value at the stripe pattern background end pixel,
by an absolute value of a difference between the stripe pattern foreground width at the pixel and the stripe pattern foreground width at the stripe pattern background end pixel.

If the present invention, if the amount of change of pixel values of upper and lower end pixels in an area along a vertical line whose lower end is each pixel, along the direction of the vertical line, is not larger than a predetermined threshold value, the stripe pattern foreground filter unit (101) may set the stripe pattern foreground filter value and the stripe pattern foreground width to zero and refrain from calculating the stripe pattern foreground filter value or the stripe pattern foreground width.

If the amount of change of pixel values of upper and lower end pixels in an area along a vertical line whose lower end is each pixel, along the direction of the vertical line, is not larger than a predetermined threshold value, the stripe pattern background filter unit (102) may set the stripe pattern background filter value and the stripe pattern background width to zero and refrain from performing calculations of the stripe pattern background filter value or the stripe pattern background width.

In an exemplary embodiment of the present invention, the image is a bird's-eye image that has been converted from an input original image so at to command a bird's-eye view of a stripe pattern which is a subject of detection.

In an exemplary embodiment of the present invention, the image from which to detect the stripe pattern is a road image photographed by a camera mounted on an own vehicle or other vehicle or by a camera provided on a road side. The stripe pattern which is a subject of detection is a zebra zone on a road surface. A lane partitioning line is detected from a road image and a surrounding area of the lane partitioning line is set to be a subject of zebra zone detection.

EMBODIMENTS

Referring to FIG. 1, an a first exemplary embodiment of the present invention is composed of a computer (a central processing device, a processor or a data processing device) 100, run under program control, and an image input device 110.

The computer (central processing device, processor or data processing device) 100 includes a stripe pattern foreground filter unit 101, a stripe pattern background filter unit 102, a stripe pattern integration filter unit 103, and an isolated feature point removal unit 104. The computer also includes a stripe pattern area detection unit 105, and a stripe pattern area output unit 106. These units operate substantially as follows:

The image input device 110 inputs an original image as a subject for detecting a stripe pattern. In the following units, the image as a subject for detection of a stripe pattern is not restricted to an original image. That is, the image as a subject for detecting the stripe pattern may be a bird's-eye image converted to command a bird's-eye view of a stripe pattern as a subject for detection, or an image converted from color values. In the following, the image that may be the subject for detecting a stripe pattern is generically referred to as 'subject image'.

For each pixel of the subject image, the stripe pattern foreground filter unit 101 calculates a stripe pattern foreground filter value (details of which will be explained later with reference to FIG. 2) and a virtual stripe pattern foreground width (details of which will be explained later with reference to FIG. 2).

For each pixel of the subject image, the stripe pattern background filter unit 102 calculates a stripe pattern background filter value (details of which will be explained later with reference to FIG. 3) and a virtual stripe pattern background width (details of which will be explained later with reference to FIG. 3).

For each pixel of the subject image, the stripe pattern integration filter unit 103 calculates a stripe pattern integration filter value (details of which will be explained later with reference to FIG. 4).

If, among the pixels in a subject image, having larger stripe pattern integration filter values, there exists an isolated pixel around which there is no pixel having a larger stripe pattern integration filter value, the isolated feature point removal unit 104 replaces the stripe pattern integration filter value in the isolated pixel by a smaller stripe pattern integration filter value.

The stripe pattern area detection unit 105 detects, in the subject image, such an area in which a feature value calculated from the stripe pattern integration filter value is not less than a predetermined threshold value, as being a stripe pattern area.

The stripe pattern area output unit 106 outputs the position, for example, of the stripe pattern area which has been detected by the stripe pattern area detection unit 105.

The above mentioned stripe pattern foreground filter value and the stripe pattern foreground width will now be described. In the following explanation, the pixel value unit a gray scale level (or a color value, such as luminance, hue, saturation or brightness) in each pixel in the image. The processing described below is carried out with each pixel in the subject image as being a pixel of interest (pixel 2).

Figure 2B:
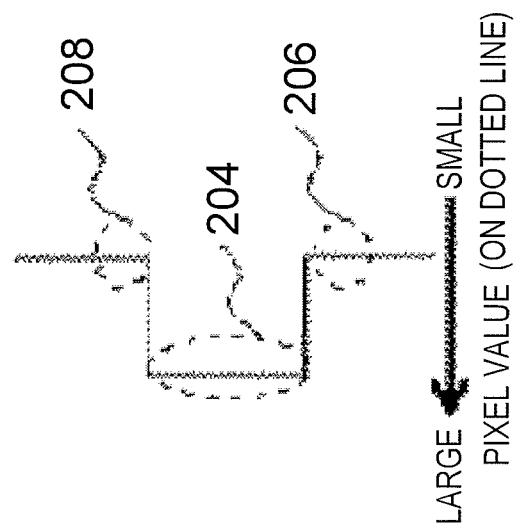
FIGS. 2A and 2B illustrate processing contents of a stripe pattern foreground filter in a first exemplary embodiment of the present invention.
Figure 2A:
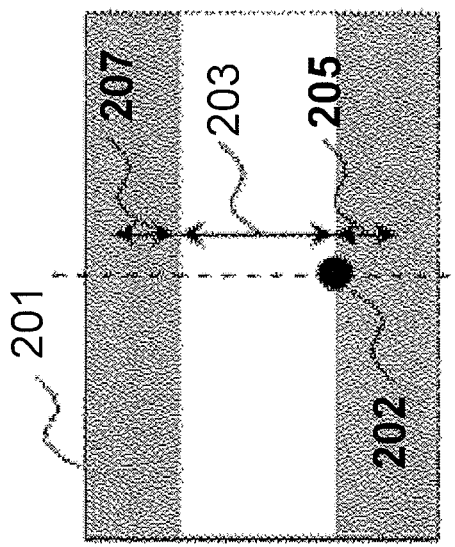

Referring to FIG. 2, with regards to the pixel of interest 202 in the subject image 201, for pixel values in a range 203 on a vertical line having the pixel of interest 202 as the lower end, a stripe pattern foreground inner side feature value 204 is calculated. The feature value 204 is some feature value or other of the pixel values in the range, such as a sum or a minimum value.

For pixel values in a range 205 on a vertical line having the pixel of interest 202 as the upper end, a stripe pattern foreground lower outer side feature value 206 is calculated. The feature value 206 is again some feature value or other of the pixel values in the range, such as a mean value or a minimum value.

For pixel values in a range 207 on a vertical line, whose lower end is an upper end of the range 205 on the vertical line having the pixel of interest 202 as the lower end, a stripe pattern foreground upper outer side feature value 208 is calculated. The feature value 208 is again some feature value or other of the pixel values in the range, such as a mean value or a maximum value.

For the stripe pattern foreground lower outer side feature value 206 and the stripe pattern foreground upper outer side feature value 208, the stripe pattern foreground outer side feature value is calculated. The stripe pattern foreground outer side feature value is again some feature value or other of the feature value 206 or 208, such as a mean value average or a minimum value.

Then, from the stripe pattern foreground inner side feature value 204 and from the stripe pattern foreground outer side feature values, such a feature value that becomes greater when the pixel value in the range 205 is higher than the pixel values in the ranges 205 and 207, is calculated as a stripe pattern foreground feature value. The feature value may be, for example, a difference obtained by subtracting the stripe pattern foreground outer side feature value from the stripe pattern foreground inner side feature value 204.

The feature values of the stripe pattern foreground are calculated for a plurality of values of the width of the range 205 changed in a preset extent. The maximum value of the feature values obtained is set to be a stripe pattern foreground filter value. The width of the range 203 that will give this maximum value is set to be the stripe pattern foreground width.

In the present description, a mean value, a difference, a minimum value or a maximum value has been given as illustrative of the feature value. The feature value is, as a matter of course, not limited thereto. It is only sufficient that, with the feature value used, the stripe pattern foreground feature value will become larger in case the pixel value in the range 205 is higher than that in the range 205 or in the range 207.

In case, at the pixel of interest 202, the amount of change of the pixel value upwards from below on the vertical line passing through the pixel is not larger than a predetermined threshold value, the striped value foreground filter value and the striped value foreground width may both be set to zero. It is then possible not to calculate the stripe pattern foreground filter value.

The stripe pattern foreground feature value may be calculated only in case the amount of change of the pixel value in a direction from below upwards on the vertical line passing the upper end pixel in the range 203 is not more than a predetermined threshold value. If otherwise, the striped value foreground feature value may be set to zero.

The stripe pattern background filter value and the stripe pattern background width will now be described. The processing, now described, is to be carried out with each pixel in a subject image 301 as a point of interest.

Figure 3B:
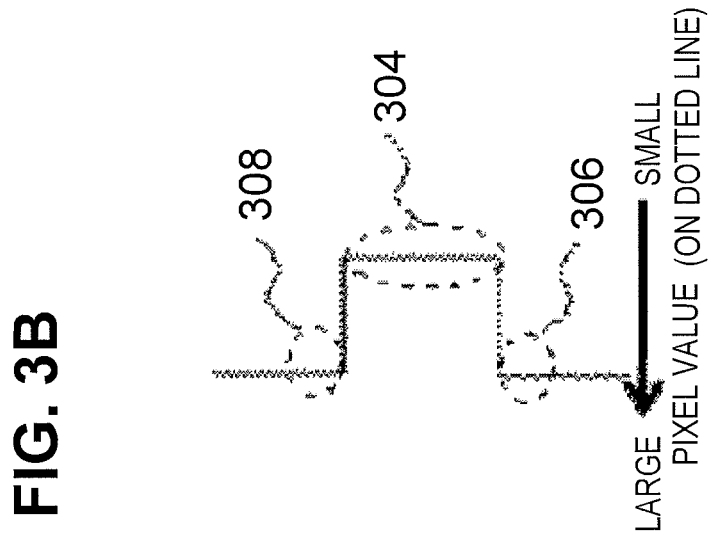
FIGS. 3A and 3B illustrate processing contents of a stripe pattern background filter in a first exemplary embodiment of the present invention.
Figure 3A:
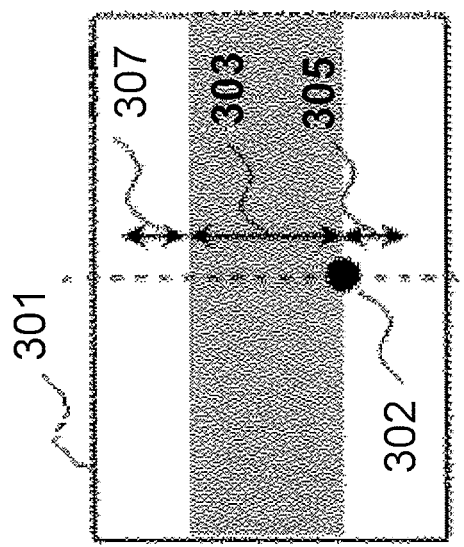

Referring to FIG. 3, with regard to a pixel of interest 302 in the subject image 301, for pixel values in a range 303 on a vertical line, having the pixel of interest 302 as the upper end point, a stripe pattern background inner side feature value 304, which is some feature value or other, for example, a mean value or a maximum value, is calculated.

For pixel values in a range 305 on a vertical line, having the pixel of interest 302 as the upper end point, a stripe pattern background lower outer side feature value 306, which is some feature value or other, for example, a mean value or a maximum value, is calculated.

For pixel values in a range 307 on a vertical line, whose lower end is the upper end of the range 305 on a vertical line, having the pixel of interest 302 as the lower point, a stripe pattern background upper outer side feature value 308 is calculated. This feature value is again some or other feature value, for example, a mean value or a maximum value.

For the stripe pattern background lower outer side feature value 306 and for the stripe pattern background upper outer side feature value 308, the stripe pattern background outer side feature value is calculated. These feature values may each be some feature value or other of the feature value 306 or 308, such as a mean value or a minimum value.

Then, from the stripe pattern background inner side feature values 304 and from the stripe pattern background outer side feature value, such a feature value that becomes greater when the pixel value in the range 303 is lower than the pixel values in the ranges 305 and 307, is calculated as a stripe pattern background feature value. The feature value that thus becomes greater may, for example, be a difference obtained by subtracting the stripe pattern background inner side feature value 304 from the stripe pattern background outer side feature value.

The stripe pattern background feature values are calculated for widths of the range 305 changed in a preset extent. The maximum one of the feature values obtained is set to be a stripe pattern background filter value. The width of the range 303 that will give this maximum value is set to be the stripe pattern background width.

In the present explanation, a mean value, a difference, a minimum value or a maximum value has been given as illustrative of the feature value. The feature value is as a matter of course, not limited thereto. It is only sufficient that, with the feature value used, the stripe pattern background feature value will become larger in case the pixel value in the range 303 is lower than that in the range 305 or in the range 307.

If, at the pixel of interest 302, the amount of change of the pixel value in a direction from below upwards on the vertical line passing through the pixel is not less than a predetermined threshold value, the stripe pattern background filter value and the stripe pattern background width may both be set to zero. It is thus possible not to calculate the stripe pattern background filter value.

The stripe pattern background feature value may be calculated only in case the amount of change of the pixel value of the upper end pixel in the range 303 in a direction from below upwards on the vertical line is not less than a predetermined threshold value. If otherwise, the stripe pattern background feature value may be set to zero.

A stripe pattern integration filter value will now be described. The processing, now described, is to be carried out with each pixel in a subject image as a point of interest.

Figure 4B:
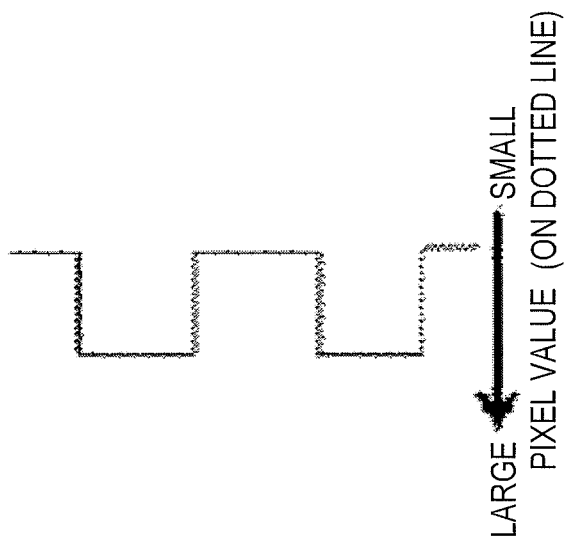
FIGS. 4A and 4B illustrate processing contents of a stripe pattern integration filter in a first exemplary embodiment of the present invention.
Figure 4A:
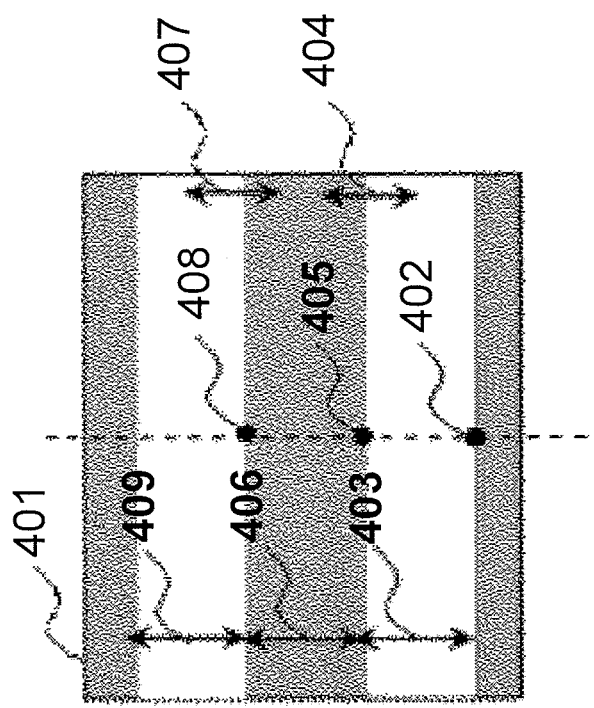

Referring to FIG. 4, a stripe pattern foreground upper end candidate pixel 405 is detected for the pixel of interest 402 in the subject image 401. That is, in a surrounding area 404 of a pixel separated by a distance equal to a stripe pattern foreground width 403 at the pixel of interest 402 upwards on a vertical line from the pixel of interest 402, the stripe pattern foreground upper end candidate pixel 405, having the maximum stripe pattern background filter value, is detected.

Then, a stripe pattern background upper end candidate pixel 408, having a maximum stripe pattern background filter value, is detected. The pixel 408 is detected in a surrounding area 407 of a pixel spaced apart from the stripe pattern foreground upper end candidate pixel 405 upwards along a vertical line by a distance equal to a stripe pattern background width 406 at the stripe pattern foreground upper end candidate pixel 405.

A stripe pattern foreground/background filter feature value is then calculated. This stripe pattern foreground/background filter feature value is some or other feature value, such as sum or minimum value, of the stripe pattern foreground filter values at the pixel of interest 402 and the stripe pattern background upper end candidate pixel 408 and the stripe pattern background filter value at the stripe pattern foreground upper end candidate pixel 405.

Then, a stripe pattern foreground uniform width feature value is calculated which is some or other feature value, such as a difference of the stripe pattern foreground width 403 for the pixel 402 and the stripe pattern foreground width 409 for the stripe pattern background upper end candidate pixel 405.

Some or other feature value such as a quotient obtained by dividing the stripe pattern foreground/background filter feature value with the stripe pattern foreground uniform width feature value is calculated and set to be a stripe pattern integration filter value.

In the present invention, a sum value, difference, a minimum value and a quotient obtained by division, are given as example feature values. The feature value is not to be restricted to these values. It is sufficient that the feature value is such a value that the stripe pattern integration filter value will become larger, the larger the stripe pattern foreground filter values at the pixel of interest 402 and at the stripe pattern background upper end candidate pixel 408 and the stripe pattern background filter value at the stripe pattern foreground upper end candidate pixel 405, and the closer the stripe pattern foreground width 403 at the pixel of interest 402 and stripe pattern foreground width 409 at the stripe pattern background upper end candidate pixel 408 to each other.

Referring to the flowcharts of FIGS. 1 and 5, the entire operation of the present exemplary embodiment will be explained in detail.

Figure 5:
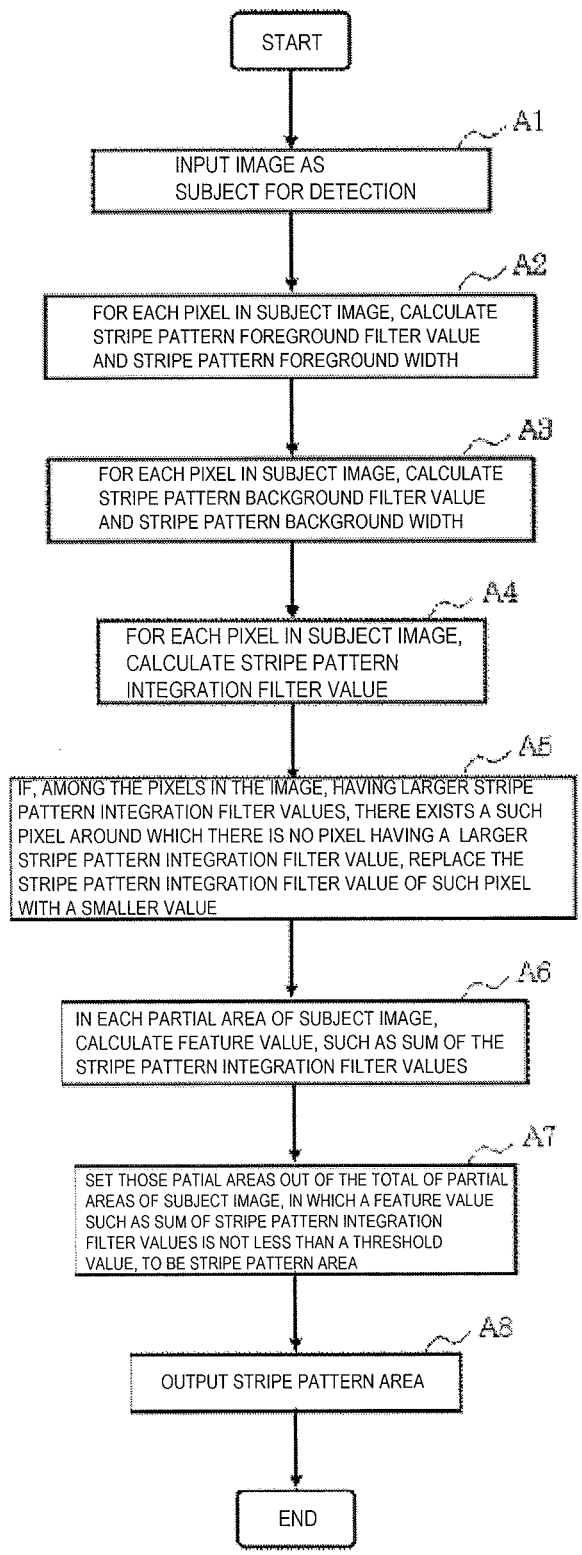
FIG. 5 is a flowchart for illustrating the operation of a first exemplary embodiment of the present invention.
Figure 6:
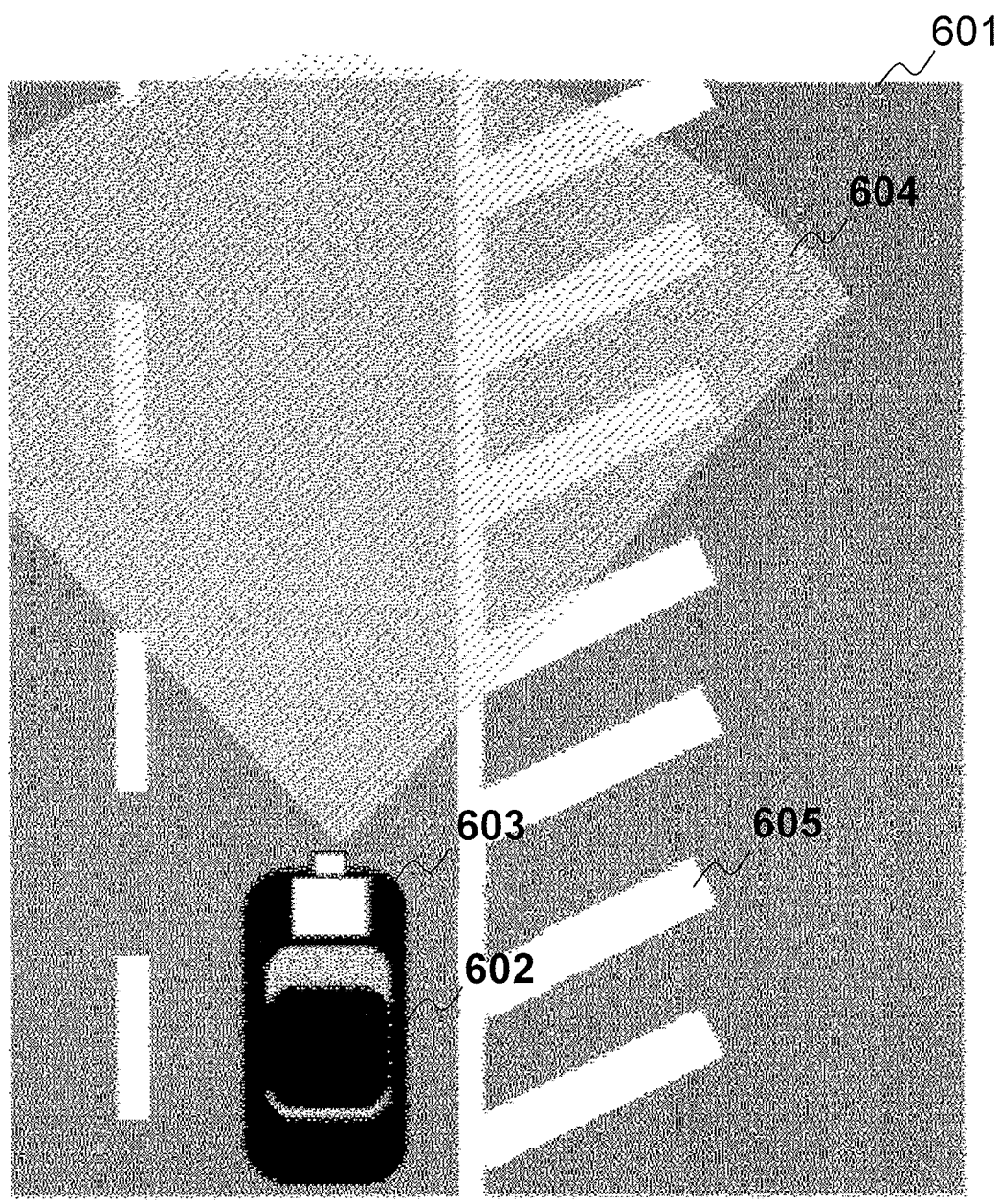
FIG. 6 is a diagram illustrating an own car, a road, a camera, and position/direction relationship of a proceeding direction.

Initially, the image input device 110 inputs a subject image from which a stripe pattern is detected (step A1 of FIG. 5).

The computer 100 then calculates the stripe pattern foreground filter value and the stripe pattern foreground width, by the stripe pattern foreground filter unit 101, for each pixel of a subject image (step A2).

Then, for each pixel of the subject image, the computer 100 calculates the stripe pattern background filter value and the stripe pattern background width by the stripe pattern background filter unit 102 (step A3).

Then, for each pixel of the subject image, the computer 100 calculates a stripe pattern integration filter value by the stripe pattern integration filter unit 103 (step A4).

If, among the pixels in the subject image, having larger stripe pattern integration filter values, there exists an isolated pixel around which there is no pixel having a larger stripe pattern integration filter value, the computer 100 replaces, by the isolated feature point removal unit 104, the stripe pattern integration filter value in the isolated pixel by a smaller stripe pattern integration filter value (step A5).

The computer 100 then computes, for each partial area of the subject image, the feature value, such as a sum, of the stripe pattern integration filter values, by the stripe pattern area detection unit 105 (step A6).

The computer 100 then sets, out of the respective partial areas, the partial area where the feature value, such as a sum, of the stripe pattern integration filter values is not lesser than a predetermined threshold value, to be a stripe pattern area, by the stripe pattern area detection unit 105 (step A7).

Finally, the computer 100 outputs a stripe pattern area by the stripe pattern area output unit 106 (step A8).

The effect of the present invention will now be described.

In the present exemplary embodiment, the shape inherent to a stripe pattern, that is, the shape composed of foregrounds of a certain width and backgrounds of another certain width, appearing alternately with each other, may directly be dealt with by combinations of localized filter processing. It is unnecessary to carry out larger numbers of area calculations, such as are needed in template matching. It is thus possible to implement the processing for detection of a stripe pattern with high detection performance with a low processing amount.

The operation of the present example will now be described using a specified example.

In the present example, a camera 603, which is mounted on a front part of an own vehicle 602, travelling on a road 601, and which is oriented in the vehicle proceeding direction, is used as an image input device 110. A zebra zone 605, as a stripe pattern area, is detected from an image that has captured a scene on the forward side of the own car. The image input device 110 is not limited to the camera oriented in the proceeding direction of the own car. For example, a camera that is mounted on the rear part of an own car and that is oriented in a direction opposite to the car proceeding direction, a camera mounted on a vehicle other than the own car, or a camera provided as an infrastructure on e.g., a road side, may also be used.

Figure 7:
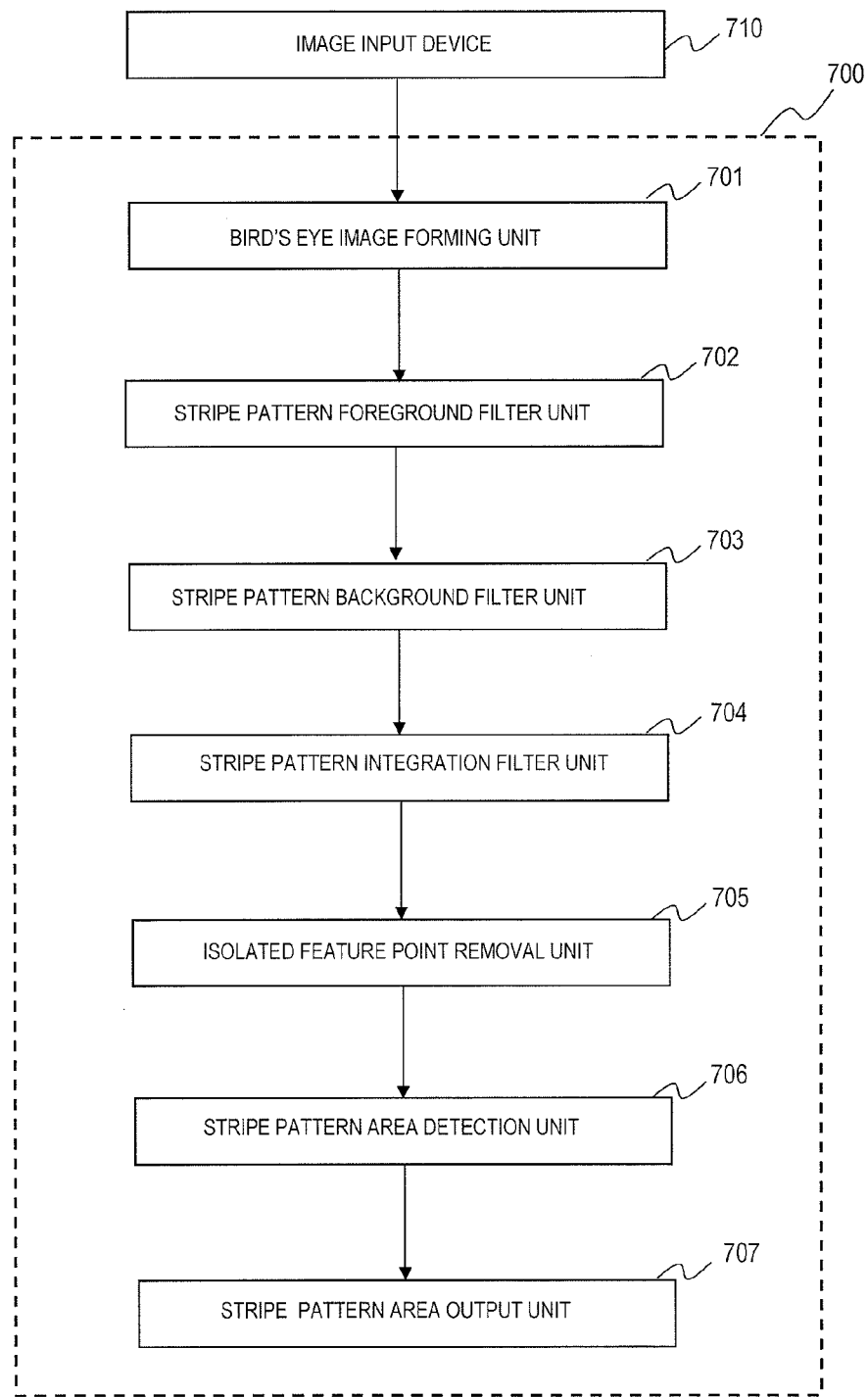
FIG. 7 is a diagram showing a configuration of a second exemplary embodiment of the present invention.

Referring to FIG. 7, the present a second exemplary embodiment includes a computer (a central processing device, a processor or a data processing device) 700, operated under program control, and an image input device 710. The computer 700 and the image input device 710 are mounted on an own vehicle, another vehicle or an infrastructure on a road side, for example. A dedicated hardware, for example, may also be used in place of the computer 700.

The computer (central processing device, processor or data processing device) 700 includes a bird's-eye image forming unit 701, a stripe pattern foreground filter unit 702, a stripe pattern background filter unit 703, and a stripe pattern integration filter unit 704. The computer also includes an isolated feature point removal unit 705, a stripe pattern area detection unit 706 and a stripe pattern area output unit 707.

The image input device 710 inputs an original image, as does the camera 603. The number of the gray scales of the original image is assumed to be 256.

Figure 8:
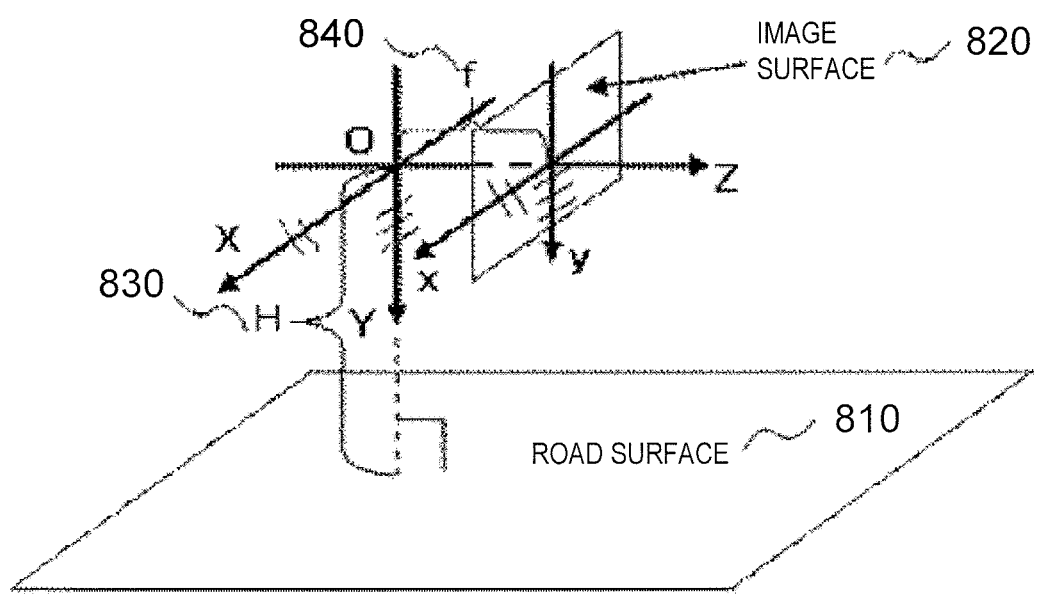
FIG. 8 is a diagram illustrating the relationship of a road surface, an image surface and a coordinate system in a second exemplary embodiment of the present invention.

The bird's-eye image forming unit 701 forms a bird's-eye image, which has been converted from the original image to command a bird's-eye view of a road surface, including the zebra zone as a subject for detection, by the following processing:

That is, a photographing coordinate system for the image input device 710 of the present example is determined as shown in FIG. 8. It is assumed that conversion in photographing from a real world into an original image is a perspective conversion, and that there is no other factor of conversion, such as lens distortion.

In FIG. 8, XYZ represents a real world coordinate system and xy represents an original image coordinate system. The X-axis is parallel to the x-axis, while the Y-axis is parallel to the y-axis. A focal length 840 in perspective conversion is f. The road surface forms a plane normal to the Y-axis. A distance 830 from the point of origin O of the real world coordinate system to a road surface 810 is H.

A pixel (xi, yi) in the original image corresponding to a point (Xi, H, Zi) on the road surface 810, is represented by the following equations (I):

$$\begin{cases} x_i = f\dfrac{X_i}{Z_i} \\ y_i = f\dfrac{H}{Z_i} \end{cases} \quad (1)$$

The bird's-eye image corresponds to an image of the road surface 810 in case the road surface 810 is looked down along a vertical downwardly direction in the real world. Hence, the bird's-eye image is equivalent to quantization of the real world coordinate values on the road surface 810 at suitable quantization steps, such as 10 cm step on the vertical axis and 10 cm step on the horizontal axis.

The conversion from the original image to the bird's-eye image is by rendering the luminance in each pixel of the bird's-eye image the luminance of a corresponding pixel in the original image represented by the equations (1).

In this case, each pixel in the bird's-eye image corresponds to each square-shaped area on the road surface 810 in the real world measuring 10 cm along the vertical direction and 10 cm along the horizontal direction.

The size of the bird's-eye image is 100 pixels along the transverse direction along the longitudinal direction for 5 m each on left and right sides about the centerline of the own vehicle 602 and 80 pixels for 8 m ahead of the vehicle in the real world. This size on the road surface in the real world is sufficient to cover the zebra zone 605 on the road surface 601. The size of 100 pixels along the transverse direction results from quantization of the distance of 10 m at quantization steps of 10 cm, while the size of 80 pixels along the longitudinal direction results from quantization of the distance of 8 m at quantization steps of 10 cm.

If the image pickup system suffers from conversion factors other than the perspective conversion, such as lens distortion, the conversion equations that take these other factors into account may be used in lieu of the equations (1). By so doing, it becomes possible to transform the original image into the bird's-eye image in an equivalent manner.

The stripe pattern foreground filter unit 702 performs the following processing to calculate the stripe pattern foreground filter value and the virtual stripe pattern foreground width for each pixel of the bird's-eye image.

Figure 9B:
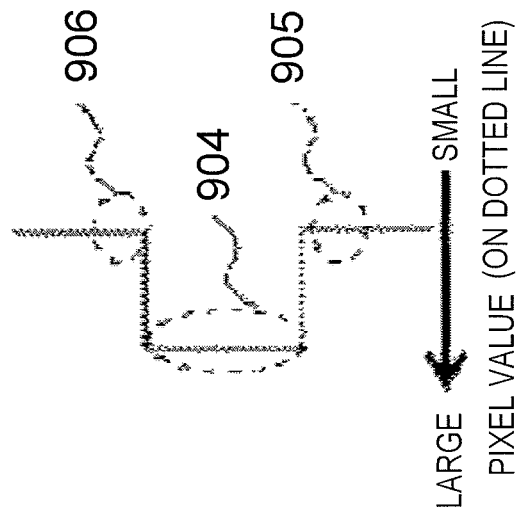
FIGS. 9A and 9B are diagrams illustrating a specified example of processing contents of a stripe pattern foreground filter in a second exemplary embodiment of the present invention.
Figure 9A:
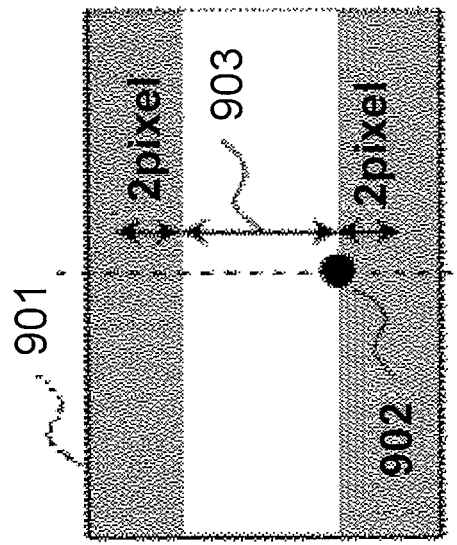

That is, in FIG. 9, for a pixel of interest 902 in a bird's-eye image 901, a stripe pattern foreground inner side feature value 904, which is an average of pixel values in a range 903 on a vertical line having the pixel of interest 902 as the lower end point, is calculated.

A stripe pattern foreground lower outer side feature value 905, which is an average of pixel values in a pixel value range of two pixels on a vertical line having the pixel of interest 902 as the upper end, is calculated.

A stripe pattern foreground upper outer side feature value 906, which is an average of pixel values in a pixel value range of two pixels on a vertical line, whose lower end is the upper end of a range 903 on another vertical line, whose lower end is the pixel of interest 902, is calculated.

A stripe pattern foreground outer side feature value, which is the stripe pattern foreground lower outer side feature value 905 or the stripe pattern foreground upper outer side feature value 906, whichever is larger, is calculated.

A value corresponding to the stripe pattern foreground inner side feature value 904 less the stripe pattern foreground outer side feature value is calculated as the stripe pattern foreground feature value.

A number of the stripe pattern foreground feature values are calculated for a number of values of widths of the range 903 which are changed pixel-wise between 5 and 20 pixels. The maximum value is set to be the stripe pattern foreground filter value, and the width of the range 903 that will give the maximum value is set to be the stripe pattern foreground width.

If, in the pixel of interest 902, the pixel value of the pixel of interest less the pixel value of the pixel neighboring to the bottom of the vertical line of the pixel of interest is not greater than a threshold value, for example, 10, the stripe pattern foreground filter value and the stripe pattern foreground width may be set to zero. The calculations of the stripe pattern foreground filter value may thus be dispensed with.

The stripe pattern foreground feature value may be calculated only in case the pixel value of the upper end pixel of the range 903 less the pixel value of the pixel neighboring to the upper end pixel on the vertical line including the upper end pixel is not less than a threshold value, such as 10. If otherwise, the stripe pattern foreground filter value may be set to zero.

Figure 10B:
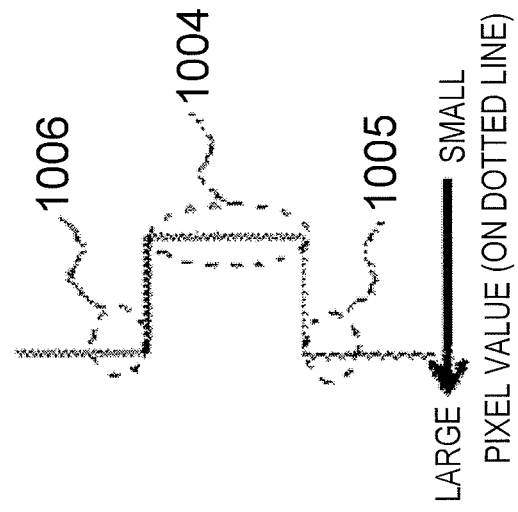
FIGS. 10A and 10B are diagrams illustrating a specified example of processing contents of a stripe pattern background filter in a second exemplary embodiment of the present invention.
Figure 10A:
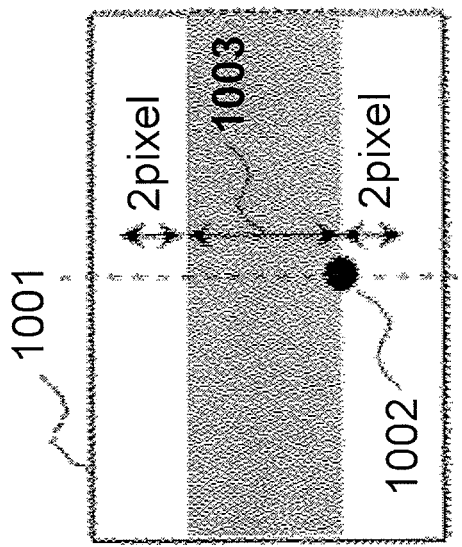

The stripe pattern background filter unit 702 performs the following processing to calculate the stripe pattern background filter value and the virtual stripe pattern background width for each pixel in the bird's-eye image:

That is, referring to FIG. 10, attention is focused on a pixel of interest 1002 in a bird's-eye image 1001. A stripe pattern background inner side feature value 1004, which is an average of pixel values in a range 1003 on a vertical line, whose lower end is the pixel of interest 1002, is calculated.

A stripe pattern background lower outer side feature value 1005, which is an average of pixel values in a 2-pixel wide range on a vertical line whose upper end is the pixel of interest 1002, is calculated.

A stripe pattern background upper outer side feature value 1006, which is an average of pixel values in a 2-pixel wide range on a vertical line whose lower end is an upper end of the range 1003 on another vertical line whose lower end is the pixel of interest 1002, is calculated.

A stripe pattern background outer side feature value, which is the stripe pattern background lower outer side feature value 1005 or the stripe pattern background upper outer side feature value 1006, whichever is smaller, is then calculated.

A value corresponding to the stripe pattern background outer side feature value less the stripe pattern background inner side feature value 1004 is calculated as the stripe pattern background feature value.

The stripe pattern background feature values are calculated corresponding to widths of the range 1003 changed from 10 to 30 pixels by a pixel base. The maximum one of the feature values is set to be the stripe pattern background filter value, and the width of the range 1003 that will give the maximum value is set to be the stripe pattern background width.

If, in the pixel of interest 1002, the pixel value of the pixel neighboring to the bottom side of the pixel of interest 1002 on the vertical line less the pixel value of the pixel of interest 1002 is not greater than a threshold value, for example, 10, the stripe pattern background filter value and the stripe pattern background width may be set to zero. The calculations of the stripe pattern background filter value may then be dispensed with.

The stripe pattern background feature value may be calculated only in case the pixel value of the pixel neighboring to the upper end pixel of the range 1003 on the vertical line less the pixel value of the upper end pixel is not less than a threshold value, such as 10. If otherwise, the stripe pattern background feature value may be set to zero.

Figure 11A:
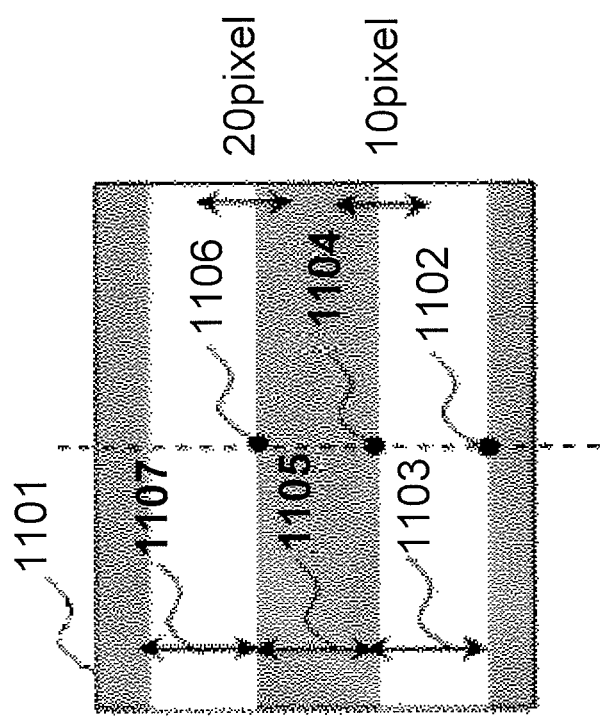
FIGS. 11A and 11B are diagrams illustrating a specified example of processing contents of a stripe pattern integration filter in a second exemplary embodiment of the present invention.
Figure 11B:
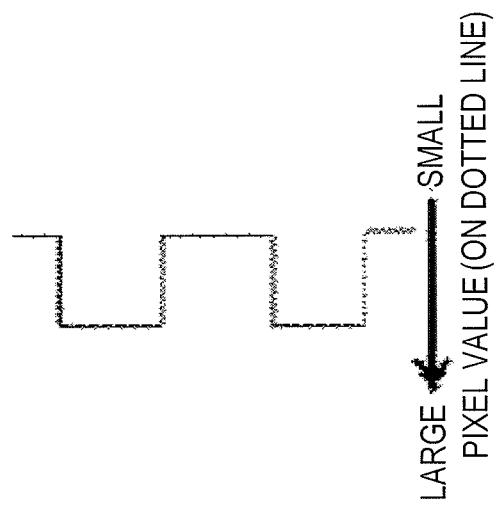

The stripe pattern integration filter unit 704 performs the following processing to calculate a stripe pattern integration filter value of each pixel in the bird's-eye image:

As shown n FIG. 11, with regard to a pixel of interest 1102 in a bird's-eye image 1101. There are a 10-pixel wide range on a vertical line, centered about a pixel separated upwards from the pixel of interest 1102 on a vertical line by a distance equal to a stripe pattern foreground width 1103 at the pixel of interest 1102, the stripe pattern foreground upper end candidate pixel 1104, having the maximum stripe pattern background filter value, is detected. In a 20-pixel wide range centered about a pixel spaced apart from the stripe pattern foreground upper end candidate pixel 1104 upwards on a vertical line by a distance equal to a stripe pattern background width 1105 at the stripe pattern foreground upper end candidate pixel 1104, a stripe pattern background upper end candidate pixel 1106, having the maximum stripe pattern background filter value, is detected.

The minimums value of the stripe pattern foreground filter values in the pixel of interest 1102 and in the stripe pattern background upper end candidate pixel 1106 and the stripe pattern background filter value at the stripe pattern foreground upper end candidate pixel 1104 is calculated as the stripe pattern foreground/background filter feature value. An stripe pattern foreground uniform width feature value, which is an absolute value of the difference between the stripe pattern foreground width 1103 at the pixel of interest 1102 and a stripe pattern foreground width 1107 at the stripe pattern background upper end candidate pixel 1106, is calculated.

The stripe pattern foreground/background filter feature value is then divided by the stripe pattern foreground uniform width feature value to give a quotient which is to be the stripe pattern integration filter value.

Figure 12:
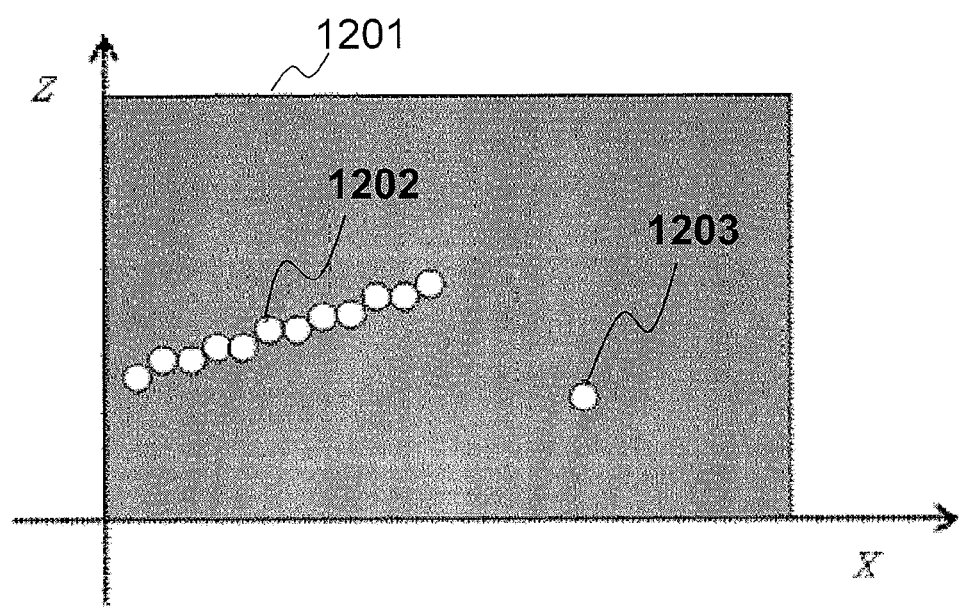
FIG. 12 is a diagram illustrating a specified example of processing contents of an isolated feature point removal unit in a second exemplary embodiment of the present invention.

Referring to FIG. 12, on pixels in a bird's-eye image 1201 whose stripe pattern integration filter value is not less than a threshold value of, for example, 30. If, among these pixels, there is a pixel, such as a pixel 1202, having one or more pixels whose stripe pattern integration filter value exceeds the threshold value of, for example, 30, within a 3-pixel range centered about the sane Z-coordinate value between left and right arbitrary vertical lines, the isolated feature point removal unit 705 leaves the stripe pattern integration filter value at the pixel 1202 intact. If conversely there exists a pixel, such as a pixel 1203, for which no pixel whose stripe pattern integration filter value exceeds a threshold value of 30, for example, within a range of 3 pixels centered about the same Z-coordinate value between arbitrary left and right vertical lines, the isolated feature point removal unit 705 replaces the stripe pattern integration filter value at the pixel 1203 by 0.

Figure 13:
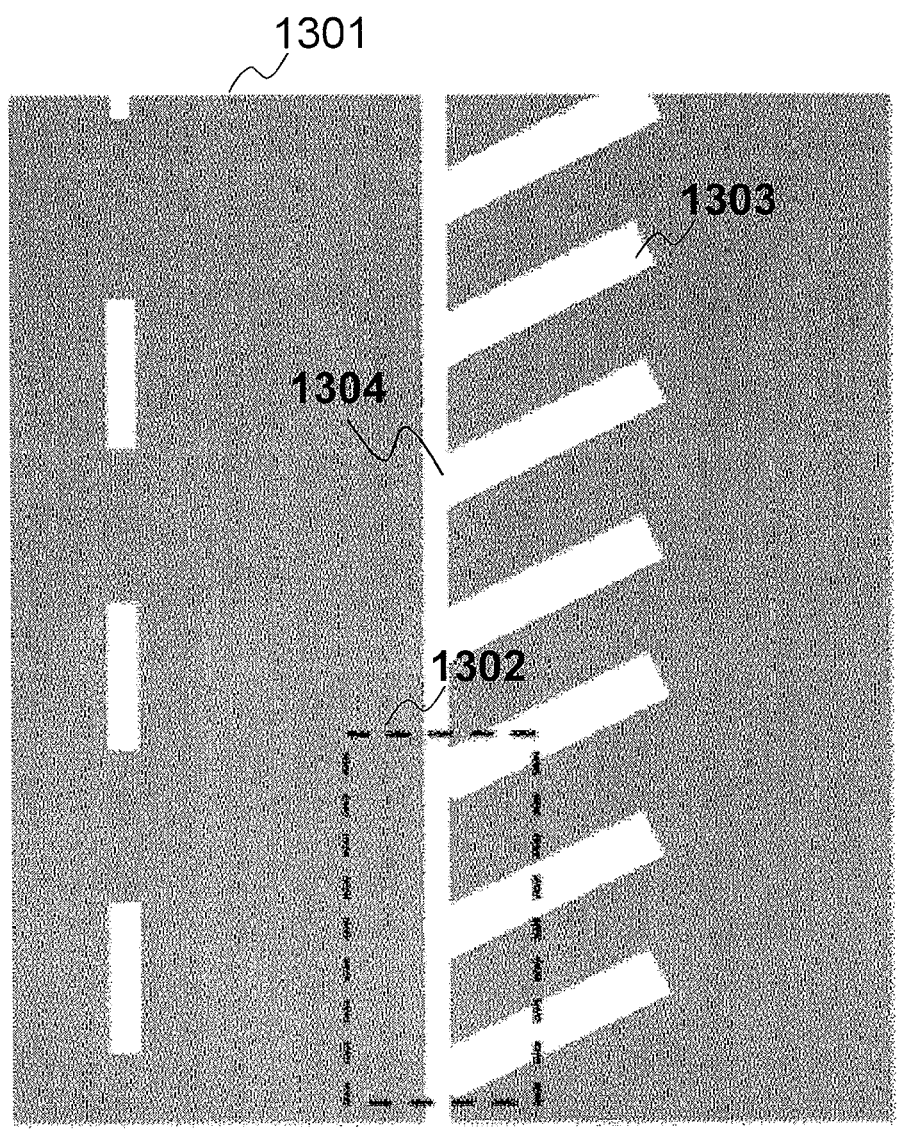
FIG. 13 is a diagram illustrating a specified example of processing contents of a stripe pattern area detecting unit in a second exemplary embodiment of the present invention.

Referring to FIG. 13, the stripe pattern area detection unit 706 sequentially shifts the position of a partial area 1302 of 50 pixels in length by 20 pixels in width in a bird's-eye image 1301 from the lower left end, so that the block of 50 pixels by 20 pixels will intermittently move at a rate of 10 pixels along a longitudinal direction and a rate of 20 pixels along the width-wise direction at a time. At each position, the sum of the stripe pattern integration filter values within the partial area 1302 is calculated. If the sum exceeds a threshold value, such as 600, at a certain position, the stripe pattern area detection unit 706 assumes that the stripe pattern area exists at such position to detect the area as the stripe pattern area.

It is possible to detect a lane partitioning line 1304 in the bird's-eye image 1301 to restrict the position of the partial area 1302 to a position neighboring to the left or right side of the lane partitioning line 1304. The position restriction is not limited to this such that some or other position relationship with respect to some road sign or other may also be used.

The pattern area output unit 707 outputs the information, such as the information on the position of the stripe pattern area detected by the stripe pattern area detection unit 706.

The operation of the present example made up of the above described components, will now be described in detail with reference to flowcharts of FIGS. 7 and 14.

Figure 14:
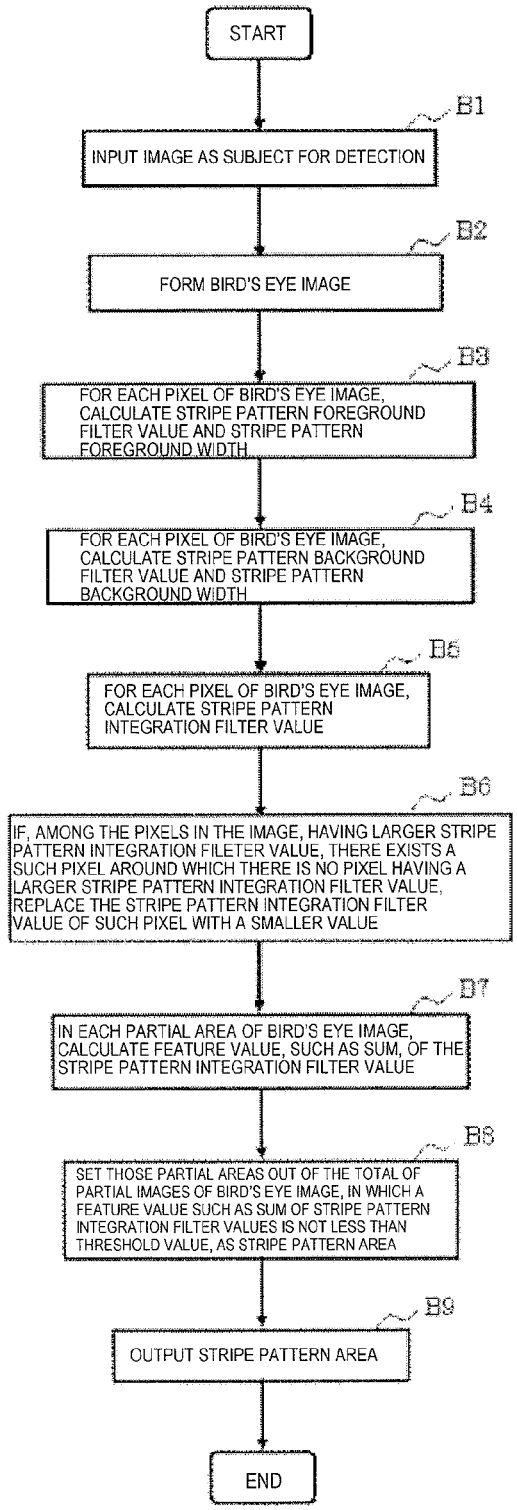
FIG. 14 is a flowchart illustrating the operation of a second exemplary embodiment of the present invention.
Figure 15:
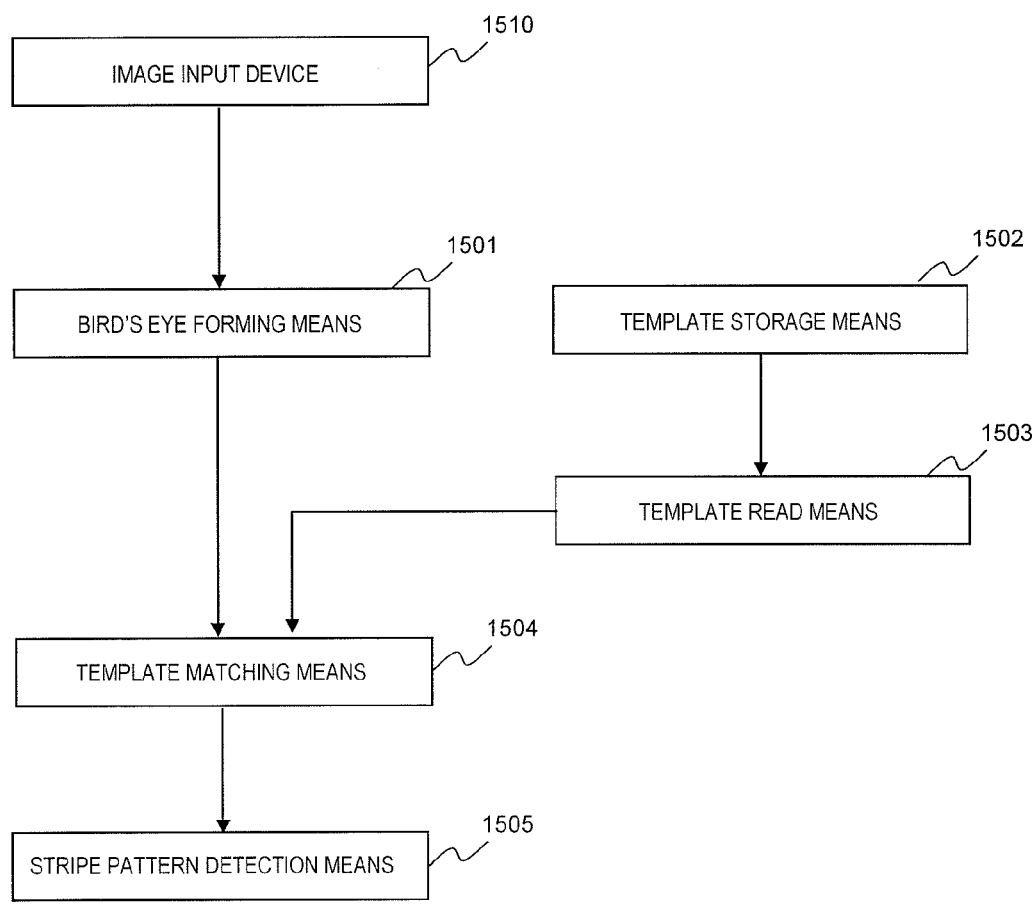
FIG. 15 is a block diagram showing a configuration of a related art technique.

Initially, the image input device 710 inputs a subject image from which to detect a stripe pattern (step B1 of FIG. 14).

The bird's-eye image forming unit 701 of the computer 700 forms a bird's-eye image that has been converted from the subject image for allowing commanding a bird's-eye view of the stripe pattern as a subject of detection (step B2).

The stripe pattern foreground filter unit 702 of the computer 700 then calculates a stripe pattern foreground filter value and a stripe pattern foreground width for each pixel of the bird's-eye image (step B3).

The stripe pattern background filter unit 703 of the computer 700 calculates a stripe pattern background filter value and a stripe pattern background width for each pixel of the bird's-eye image (step B4).

The stripe pattern integration filter unit 704 of the computer 700 further calculates a stripe pattern integration filter value for each pixel of the bird's-eye image (step B5).

If, among the pixels in a subject image, having larger stripe pattern integration filter values, there exists an isolated pixel around which there is no pixel having a larger stripe pattern integration filter value, the isolated feature point removal unit 705 of the computer 700 replaces the stripe pattern integration filter value in the isolated pixel by a smaller stripe pattern integration filter value (step B6).

The stripe pattern area detection unit 706 of the computer 700 calculates a feature value, such as a sum, of stripe pattern integration filter values, for each of partial areas of the bird's-eye image (step B7).

The stripe pattern area detection unit 706 of the computer 700 sets, out of the partial areas of the bird's-eye image, such a partial area in which a feature value, such as a sum of the stripe pattern integration filter values, is not less than a predetermined threshold value, as being a stripe pattern area (step B8).

Finally, the stripe pattern area output unit 707 of the computer 700 outputs the stripe pattern area (step B9).

INDUSTRIAL APPLICABILITY

The present invention may be applied to such use as detection of a stripe pattern from an image and detection of a zebra zone from an image acquired by a vehicle mounted camera.

The disclosure of the aforementioned Patent Document 1 is incorporated by reference herein. The particular exemplary embodiments or examples may be modified or adjusted within the gamut of the entire disclosure of the present invention, inclusive of claims, based on the fundamental technical concept of the invention. Further, a large variety of combinations or selection of elements disclosed herein may be made within the framework of the claims. That is, the present invention may comprehend a variety of modifications or corrections that may occur to those skilled in the art in accordance with and within the gamut of the entire disclosure of the present invention, inclusive of claim and the technical concept of the present invention.

The invention claimed is:

1. A system for detecting a stripe pattern, comprising:
a stripe pattern foreground filter unit that calculates, for each pixel in an image, feature values, each representing an increment of a pixel value in a surrounding area of said each pixel from a pixel value outside of said surrounding area, as a size of said surrounding area is changed, to find a maximum value out of said feature values, said stripe pattern foreground filter unit allotting said maximum value as a stripe pattern foreground filter value, said stripe pattern foreground filter unit allotting a size of said surrounding area that gives said maximum value as a stripe pattern foreground width;
a stripe pattern background filter unit that calculates, for each pixel in an image, feature values, each representing a decrement of a pixel value in a surrounding area of said each pixel from a pixel value outside of said surrounding area, as a size of said surrounding area is changed, to find a maximum value out of said feature values, said stripe pattern background filter unit allotting said maximum value as a stripe pattern background filter value, said stripe pattern background filter unit allotting a size of said surrounding area that gives said maximum value as a stripe pattern background width;
a stripe pattern integration filter unit that calculates a stripe pattern integration filter value, for each pixel in said image, based on said stripe pattern foreground filter value in said pixel,
on said stripe pattern background filter value at a stripe pattern foreground end pixel that gives a maximum value out of said stripe pattern background filter values in a surrounding area of a pixel spaced apart from said each pixel by a distance corresponding to said stripe pattern foreground width at said each pixel, and
on said stripe pattern foreground filter value at a stripe pattern background end pixel that gives a maximum value out of said stripe pattern foreground filter values in a surrounding area of a pixel spaced apart from said stripe pattern foreground end pixel by a distance corresponding to said stripe pattern background width at said stripe pattern foreground end pixel; and
a stripe pattern area detection unit that decides, for each area in said image, whether or not a stripe pattern is contained in said each area, based on a feature value which is calculated from said stripe pattern integration filter value in said each area, said stripe pattern area detection unit outputting position information regarding said area in which said stripe pattern is contained, as stripe pattern area information.

2. The stripe pattern detection system according to claim 1, wherein said stripe pattern integration filter unit calculates said stripe pattern integration filter value, based further on said stripe pattern foreground width at said each pixel and on said stripe pattern foreground width at said stripe pattern background end pixel.

3. The stripe pattern detection system according to claim 1, wherein in said stripe pattern foreground filter unit, said surrounding area of said pixel is an area on a vertical line whose lower end is said each pixel, a size of said surrounding area being a width of said area on said vertical line, wherein in said stripe pattern background filter unit,
said surrounding area of said each pixel is an area on a vertical line having said each pixel as a lower end, a size of said surrounding area being a width of said area on said vertical line, and wherein in said stripe pattern integration filter unit,
a surrounding area of a pixel spaced apart from said each pixel by a distance corresponding to said stripe pattern foreground width at said each pixel is an area on a vertical line centered about a pixel spaced apart from said each pixel by a distance corresponding to said stripe pattern foreground width at said each pixel, and
a surrounding area of a pixel spaced apart from said stripe pattern foreground end pixel by a distance corresponding to said stripe pattern background width at said stripe pattern foreground end pixel is an area on a vertical line centered about a pixel spaced apart from said stripe pattern foreground end pixel by a distance corresponding to a stripe pattern background width at said stripe pattern foreground end pixel.

4. The stripe pattern detection system according to claim 1, wherein in said stripe pattern foreground filter unit, a feature value representing an increment of a pixel value in a surrounding area of said each pixel from a pixel value outside said surrounding area is a value obtained by subtracting a sum of pixel values outside of said surrounding area of said each pixel from a sum of pixel values in said surrounding area; and wherein in said stripe pattern background filter unit,
a feature value representing a decrement of a pixel value in a surrounding area of said each pixel from pixel values outside of said surrounding area is a value obtained by subtracting a sum of pixel values in said surrounding area of said each pixel from a sum of pixel values outside said surrounding area.

5. The stripe pattern detection system according to claim 1, wherein in said stripe pattern integration filter unit, said stripe pattern integration filter value is a minimum value out of said stripe pattern foreground filter value at said each pixel,
said stripe pattern background filter value at said stripe pattern foreground end pixel, and
said stripe pattern foreground filter value at said stripe pattern background end pixel.

6. The stripe pattern detection system according to claim 2, wherein in said stripe pattern integration filter unit, said stripe pattern integration filter value is a value obtained by dividing a minimum value out of
said stripe pattern foreground filter value at said each pixel,
said stripe pattern background filter value at said stripe pattern foreground end pixel, and
said stripe pattern foreground filter value at said stripe pattern background end pixel, by an absolute value of a difference between said stripe pattern foreground width at said each pixel and said stripe pattern foreground width at said stripe pattern background end pixel.

7. The stripe pattern detection system according to claim 3, wherein in case an amount of change of pixel values of upper and lower end pixels in an area along a vertical line whose lower end is said each pixel, along a direction of said vertical line, is not larger than a predetermined threshold value,
said stripe pattern foreground filter unit sets said stripe pattern foreground filter value and said stripe pattern foreground width to zero and refrains from calculating said stripe pattern foreground filter value and said stripe pattern foreground width; and wherein
in case an amount of change of a pixel values of an upper and lower end pixels in an area along a vertical line whose lower end is said each pixel, along a direction of said vertical line, is not larger than a predetermined threshold value,
said stripe pattern background filter unit sets said stripe pattern background filter value and said stripe pattern background width to zero and refrains from performing calculations of said stripe pattern background filter value and said stripe pattern background width.

8. The stripe pattern detection system according to claim 1, wherein said image includes
a bird's-eye image converted from an input original image for allowing to command bird's eye view of a stripe pattern as a subject of detection.

9. The stripe pattern detection system according to claim 1, further comprising:
an isolated feature point removal unit that operates so that, if, among pixels in said image, having larger stripe pattern integration filter values, there exists an isolated pixel around which there is no pixel having a larger stripe pattern integration filter value,
said stripe pattern integration filter value of said isolated pixel will be replaced by a relatively small stripe pattern integration filter value.

10. The stripe pattern detection system according to claim 1, wherein said image from which to detect a stripe pattern includes
a road image photographed by a camera mounted on an own car or another car or provided on a road side; and wherein
the stripe pattern being detected is a zebra zone on a road surface.

11. The stripe pattern detection system according to claim 10, wherein a lane partitioning line is detected from said road image; and wherein
a surrounding area of said lane partitioning line is set to be a subject for zebra zone detection.

12. The stripe pattern detection system according to claim 1, wherein for said each pixel in said image, said stripe pattern foreground filter unit performs a first preset operation on pixel values in a first range on a vertical line having said each pixel as a lower end to calculate a stripe pattern foreground inner side feature value,
said stripe pattern foreground filter unit performing a second preset operation on pixel values in a second range on a vertical line having said each pixel as an upper end to calculate a stripe pattern foreground lower outer side feature value,
said stripe pattern foreground filter unit performing a third preset operation on pixel values in a third range on a vertical line having as a lower end an upper end of said second range on another vertical line whose upper end is said each pixel, to calculate a stripe pattern foreground upper outer side feature value, said stripe pattern foreground filter unit performing a fourth preset operation on said stripe pattern foreground lower outer side feature value and on said stripe pattern foreground upper outer side feature value to calculate a stripe pattern foreground outer side feature value, said stripe pattern foreground filter unit calculating, from said stripe pattern foreground inner side feature value and said stripe pattern foreground outer side feature value, such a feature value that becomes larger the higher a pixel value in said first range than a pixel value in said second range or a pixel value in said third range, as a stripe pattern foreground feature value, said stripe pattern foreground filter unit calculating a plurality of said stripe pattern foreground feature values as a width of said second range is varied within a preset extent; setting a maximum stripe pattern foreground feature value as a stripe pattern foreground filter value, and setting a width of said first range that gives said maximum stripe pattern foreground feature value as a stripe pattern foreground width.

13. The stripe pattern detection system according to claim 1, wherein said stripe pattern background filter unit performs a first preset operation on pixel values in a first range on a vertical line whose lower end is said each pixel, for said each pixel in said image, to calculate a stripe pattern background inner side feature value, said stripe pattern background filter unit performing a second preset operation on pixel values in a second range on a vertical line whose upper end is said each pixel, for each said pixel in said image, to calculate a stripe pattern background outer lower side feature value, said stripe pattern background filter unit performing a third preset operation on pixel values in a third range on a vertical line whose lower end is an upper end of a second range on another vertical line having said each pixel as an upper end to calculate a stripe pattern background upper outer side feature value, said stripe pattern background filter unit performing a fourth preset operation on said stripe pattern background lower outer side feature value and on said stripe pattern background upper outer side feature value to calculate a stripe pattern background outer side feature value, said stripe pattern background filter unit calculating, from said stripe pattern background inner side feature value and said stripe pattern background outer side feature value, such a feature value that becomes larger the lower a pixel value in said first range than a pixel value in said second range or a pixel value in said third range, as a stripe pattern background feature value, said stripe pattern background filter unit calculating a plurality of said stripe pattern background feature values as a width of said second range is varied within a preset extent, said stripe pattern foreground filter unit setting a maximum stripe pattern background feature value as a stripe pattern background filter value, said stripe pattern background filter unit setting a width of said first range that gives said maximum stripe pattern background feature value as a stripe pattern background width.

14. The stripe pattern detection system according to claim 1, wherein
said stripe pattern integration filter unit detects, for said each pixel in said image, a stripe pattern foreground upper end candidate pixel having a maximum stripe pattern background filter value in a surrounding area of a pixel spaced apart upwards on a vertical line from said each pixel by a distance equal to a stripe pattern foreground width at said each pixel, said stripe pattern integration filter unit detecting a stripe pattern background upper end candidate pixel having a maximum stripe pattern background filter value in a surrounding area of a pixel spaced apart upwards from said stripe pattern foreground upper end candidate pixel on a vertical line by a distance equal to a stripe pattern background width at said stripe pattern foreground upper end candidate pixel, said stripe pattern integration filter unit performing a fifth preset operation on stripe pattern foreground filter values at said each pixel and at said stripe pattern background upper end candidate pixel and on a stripe pattern background filter value at said stripe pattern foreground upper end candidate pixel to calculate a stripe pattern foreground/background filter feature value, said stripe pattern integration filter unit performing a sixth preset operation on said stripe pattern foreground widths at said each pixel and at said stripe pattern background upper end candidate pixel to calculate a stripe pattern foreground uniform width feature value, said stripe pattern integration filter unit performing a seventh preset operation on said stripe pattern foreground/background filter feature value and said stripe pattern foreground uniform width feature value to calculate a stripe pattern integration filter value.

15. The stripe pattern detection system according to claim 12, wherein said first preset operation finds a sum or a minimum value, and
said second, third and fourth preset operations find a mean value or a maximum value.

16. The stripe pattern detection system according to claim 14, wherein said fifth preset operation finds a sum or a minimum value,
said sixth preset operation finds a difference, and
said seventh preset operation divides said stripe pattern foreground/background filter feature value by said stripe pattern foreground uniform width feature value.

17. The stripe pattern detection system according to claim 1, wherein said stripe pattern integration filter unit detects, for said each pixel in said image,
a stripe pattern foreground upper end candidate pixel, having a maximum stripe pattern background filter value, in a surrounding area of a pixel spaced apart upwards on a vertical line from said each pixel by a distance corresponding to a stripe pattern foreground width at said each pixel, said stripe pattern integration filter unit detecting a stripe pattern background upper end candidate pixel, having a maximum stripe pattern background filter value, in a surrounding area of a pixel spaced apart upwards on a vertical line from said stripe pattern foreground upper end candidate pixel by a distance corresponding to a stripe pattern background width at said stripe pattern foreground upper end candidate pixel, said stripe pattern integration filter unit setting a feature value, as a result of said preset operation on the stripe pattern foreground filter values at said each pixel and at said stripe pattern foreground upper end candidate pixel and on a stripe pattern background filter value at said stripe pattern foreground upper end candidate pixel, to be a stripe pattern foreground/background filter feature value, said stripe pattern integration filter unit setting feature values, as results of preset operations on a stripe pattern foreground width at said each pixel and on a stripe pattern foreground width at said stripe pattern background upper end candidate pixel, to be a stripe pattern foreground uniform width, said stripe pattern integration filter unit setting a feature value, as results of preset operations on a stripe pattern foreground/background filter feature value and said stripe pattern foreground uniform width feature value, to be said stripe pattern integration filter value.

18. A method for detecting a stripe pattern, comprising:

calculating, for each pixel in an image, feature values, each representing an increment of a pixel value in a surrounding area of said each pixel from pixel values outside of said surrounding area, as a size of said surrounding area is changed, to find a maximum value out of said feature values, allotting said maximum value as a stripe pattern foreground filter value, and allotting a size of said surrounding area that gives said maximum value as being a stripe pattern foreground width;

calculating, for each pixel in said image, feature values, each representing a decrement of a pixel value in a surrounding area of said each pixel from pixel values outside of said surrounding area, as a size of said surrounding area is changed, to find a maximum value out of said feature values, allotting said maximum value as a stripe pattern background filter value, and allotting a size of said surrounding area that gives said maximum value as being a stripe pattern background width;

calculating a stripe pattern integration filter value at each pixel in said image, based on said stripe pattern foreground filter value in said each pixel, on said stripe pattern background filter value at a stripe pattern foreground end pixel that gives a maximum value out of said stripe pattern background filter values in a surrounding area of a pixel spaced apart from said each pixel by a distance corresponding to said stripe pattern foreground width at said each pixel, and on said stripe pattern foreground filter value at a stripe pattern background end pixel that gives a maximum value out of said stripe pattern foreground filter values in a surrounding area of a pixel spaced apart from said stripe pattern foreground end pixel by a distance corresponding to said stripe pattern background width at said stripe pattern foreground end pixel;

deciding, for each area in said image, whether or not a stripe pattern is contained in said each area, from a feature value calculated from said stripe pattern integration filter value in said each area; and outputting position information regarding said area, in which said stripe pattern is contained as stripe pattern area information.

19. The stripe pattern detection method according to claim 18, comprising calculating said stripe pattern integration filter value based further on said stripe pattern foreground width at said each pixel and on said stripe pattern foreground width at said stripe pattern background end pixel.

20. The stripe pattern detection method according to claim 18, wherein said surrounding area of said each pixel is an area on a vertical line whose lower end is said each pixel, a size of said surrounding area being a width of said area on a vertical line; wherein a surrounding area of a pixel spaced apart from said each pixel by a distance corresponding to said stripe pattern foreground width at said each pixel is an area on a vertical line centered about a pixel spaced apart from said each pixel by a distance corresponding to said stripe pattern foreground width at said each pixel; and wherein a surrounding area of a pixel spaced apart from said stripe pattern foreground end pixel by a distance corresponding to said stripe pattern background width at said stripe pattern foreground end pixel being an area on a vertical line centered about a pixel spaced apart from said stripe pattern foreground end pixel by a distance corresponding to said stripe pattern background width at said stripe pattern foreground end pixel.

21. The stripe pattern detection method according to claim 18, wherein a feature value representing an increment of a pixel value in a surrounding area of said each pixel from pixel values outside of said surrounding area is a value obtained by subtracting a sum of pixel values outside said surrounding area of said each pixel from a sum of pixel values in said surrounding area; and wherein the feature value representing a decrement of a pixel value in a surrounding area of said each pixel from pixel values outside of said surrounding area is a value obtained by subtracting a sum of pixel values in said surrounding area of said each pixel from a sum of pixel values outside said surrounding area.

22. The stripe pattern detection system according to claim 18, wherein said stripe pattern integration filter value is a minimum value out of said stripe pattern foreground filter value at said each pixel, said stripe pattern background filter value at said stripe pattern foreground end pixel, and said stripe pattern foreground filter value at said stripe pattern background end pixel.

23. The stripe pattern detection method according to claim 19, wherein said stripe pattern integration filter value is a value obtained by dividing a minimum value out of said stripe pattern foreground filter value at said each pixel, said stripe pattern background filter value at said stripe pattern foreground end pixel, and said stripe pattern foreground filter value at said stripe pattern background end pixel, by an absolute value of a difference between said stripe pattern foreground width at said each pixel and said stripe pattern background width at said stripe pattern background end pixel.

24. The stripe pattern detection method according to claim 20, wherein, if an amount of change of pixel values of upper and lower end pixels in an area along a vertical line whose lower end is said each pixel, along a direction of said vertical line, is not larger than a predetermined threshold value, said stripe pattern foreground filter value and said stripe pattern foreground width are set to zero and said stripe pattern foreground filter value or said stripe pattern foreground width is not calculated; and wherein if an amount of change of pixel values of upper and lower end pixels in an area along a vertical line whose lower end is said each pixel, along a direction of said vertical line, is not larger than a predetermined threshold value, said stripe pattern background filter value and said stripe pattern background width are set to zero and said stripe pattern background filter value or said stripe pattern background width is not calculated.

25. The stripe pattern detection method according to claim 18, wherein said image includes a bird's-eye image converted from an input original image to command a bird's eye view of a stripe pattern as a subject of detection.

26. The stripe pattern detection method according to claim 18, wherein, if, among pixels in said image, having larger stripe pattern integration filter values, there exists an isolated pixel around which there is no pixel having a larger stripe pattern integration filter value, said stripe pattern integration filter value of said isolated pixel is replaced by a relatively small stripe pattern integration filter value.

27. The stripe pattern detection method according to claim 18, wherein said image from which to detect a stripe pattern includes a road image photographed by a camera mounted on an own car or another car or provided on a road side; and wherein the stripe pattern being detected is a zebra zone on a road surface.

28. The stripe pattern detection system according to claim 27, wherein a lane partitioning line is detected from a road image; and wherein a surrounding area of said lane partitioning line is set to be a subject for zebra zone detection.

29. A non-transitory computer-readable recording medium storing a computer readable program for executing:

a stripe pattern foreground filtering processing of calculating, for each pixel in an image, feature values, each representing an increment of a pixel value in a surrounding area of said each pixel from pixel values outside of said surrounding area, as a size of said surrounding area is changed, to find a maximum value out of said feature values, allotting said maximum value as a stripe pattern foreground filter value, and allotting a size of said surrounding area that gives said maximum value as being a stripe pattern foreground width;

a stripe pattern background filtering processing of calculating, for each pixel in said image, feature values, each representing a decrement of a pixel value in a surrounding area of said each pixel from pixel values outside of said surrounding area, as a size of said surrounding area is changed, to find a maximum value out of said feature values, allotting said maximum value as a stripe pattern background filter value, and allotting a size of said surrounding area that gives said maximum value as being a stripe pattern background width;

a stripe pattern integration filtering processing of calculating and allotting a stripe pattern integration filter value at each pixel in said image, based on said stripe pattern foreground filter value in said each pixel, on said stripe pattern background filter value at a stripe pattern foreground end pixel that gives a maximum value out of said stripe pattern background filter values in a surrounding area of a pixel spaced apart from said each pixel by a distance corresponding to said stripe pattern foreground width at said each pixel, and on said stripe pattern foreground filter value at a stripe pattern background end pixel that gives a maximum value out of said stripe pattern foreground filter values in a surrounding area of a pixel spaced apart from said stripe pattern foreground end pixel by a distance corresponding to said stripe pattern background width at said stripe pattern foreground end pixel; and a stripe pattern detection processing of deciding, for each area in said image, whether or not a stripe pattern is contained in said each area, from a feature value calculated from said stripe pattern integration filter value in said each area, and outputting position information regarding said area containing said stripe pattern as stripe pattern area information.

30. The non-transitory computer-readable recording medium according to claim 29, wherein in said stripe pattern integration filtering processing, said stripe pattern integration filter value is calculated based further on said stripe pattern foreground width at said each pixel and on said stripe pattern foreground width at said stripe pattern background end pixel.

31. The non-transitory computer-readable recording medium according to claim 29, wherein in said stripe pattern foreground filtering processing, said surrounding area of said each pixel is an area on a vertical line whose lower end is said each pixel, a size of said surrounding area is a width of said area on a vertical line; wherein in said stripe pattern background filtering processing, a surrounding area of said each pixel is an area on a vertical line whose lower end is said each pixel, a size of said surrounding area is a width of said area on a vertical line; and wherein in said stripe pattern integration filtering processing, a surrounding area of a pixel spaced apart from said each pixel by a distance corresponding to said stripe pattern foreground width at said each pixel is an area on a vertical line centered about a pixel spaced apart from said each pixel by a distance corresponding to said stripe pattern foreground width at said each pixel, and a surrounding area of a pixel spaced apart from said stripe pattern foreground end pixel by a distance corresponding to said stripe pattern background width at said stripe pattern foreground end pixel is an area on a vertical line centered about a pixel spaced apart from said stripe pattern foreground end pixel by a distance corresponding to said stripe pattern background width at said stripe pattern foreground end pixel.

32. The non-transitory computer-readable recording medium according to claim 29, wherein in said stripe pattern foreground filtering processing, a feature value representing an increment of a pixel value in a surrounding area of said each pixel from pixel values outside of said surrounding area is a value obtained by subtracting a sum of pixel values outside said surrounding area of said each pixel from a sum of pixel values in said surrounding area; and wherein in said stripe pattern background filtering processing, a feature value representing a decrement of a pixel value in a surrounding area of said each pixel from pixel values outside of said surrounding area is a value obtained by subtracting a sum of pixel values in said surrounding area of said each pixel from a sum of pixel values outside said surrounding area.

33. The non-transitory computer-readable recording medium according to claim 29, wherein, in said stripe pattern integration filtering processing, said stripe pattern integration filter value is a minimum value out of said stripe pattern foreground filter value at said each pixel, said stripe pattern background filter value at said stripe pattern foreground end pixel, and said stripe pattern foreground filter value at said stripe pattern background end pixel.

34. The non-transitory computer-readable recording medium according to claim 30, wherein, in said stripe pattern integration filtering processing, said stripe pattern integration filter value is a value obtained by dividing a minimum value out of said stripe pattern foreground filter value at said each pixel, said stripe pattern background filter value at said stripe pattern foreground end pixel, and said stripe pattern foreground filter value at said stripe pattern background end pixel, by an absolute value of a difference between said stripe pattern foreground width at said each pixel and said stripe pattern foreground width at said stripe pattern background end pixel.

35. The non-transitory computer-readable recording medium according to claim 31, wherein, if, in said stripe pattern foreground filtering processing, an amount of change of pixel values of upper and lower end pixels in an area along a vertical line whose lower end is said each pixel, along a direction of said vertical line, is not larger than a predetermined threshold value,
said stripe pattern foreground filter value and said stripe pattern foreground width are set to zero and said stripe pattern foreground filter value or said stripe pattern foreground width is not calculated; and wherein
if, in said stripe pattern background filtering processing, an amount of change of pixel values of upper and lower end pixels in an area along a vertical line whose lower end is said each pixel, along a direction of said vertical line, is not larger than a predetermined threshold value,
said stripe pattern background filter value and said stripe pattern background width are set to zero and said stripe pattern background filter value or said stripe pattern background width is not calculated.

36. The non-transitory computer-readable recording medium according to claim 29, wherein said image includes a bird's-eye image converted from an input original image for allowing to command a bird's eye view of a stripe pattern as a subject of detection.

37. The non-transitory computer-readable recording medium according to claim 29, wherein said program further causes a computer to execute
an isolated feature point removal processing in which, if, among pixels in said image, having larger stripe pattern integration filter values, there exists an isolated pixel around which there is no pixel having a larger stripe pattern integration filter value, said stripe pattern integration filter value of said isolated pixel is replaced by a relatively small stripe pattern integration filter value.

38. The non-transitory computer-readable recording medium according to claim 29, wherein said image from which to detect a stripe pattern includes a road image photographed by a camera mounted on an own car or another car or provided on a road side; and wherein
a stripe pattern being detected is a zebra zone on a road surface.

39. The non-transitory computer-readable recording medium according to claim 38, wherein a lane partitioning line is detected from a road image; and wherein
a surrounding area of said lane partitioning line is set to be a subject for zebra zone detection.

40. A system for detection of a stripe pattern comprising:
a stripe pattern foreground filter unit that calculates, for each pixel in an image, feature values, each representing an increment of a pixel value in a surrounding area of said each pixel from pixel values outside of said surrounding area, as a size of said surrounding area is changed,
said stripe pattern foreground filter unit finding, as a stripe pattern foreground filter value, such feature value out of said feature values that satisfies a preset condition regarding a certain large-small relationship,
said stripe pattern foreground filter unit finding a width of said surrounding area corresponding to said stripe pattern foreground filter value as being a stripe pattern foreground width,
a stripe pattern background filter unit that calculates, for each pixel in said image, feature values, each representing a decrement of a pixel value in a surrounding area of said each pixel from pixel values outside of said surrounding area, as a size of said surrounding area is changed,
said stripe pattern background filter unit finding, as a stripe pattern background filter value, such feature value out of said feature values that satisfies a preset condition regarding a certain large-small relationship,
said stripe pattern background filter unit finding a width of said surrounding area corresponding to said stripe pattern background filter value as being a stripe pattern background width;
a stripe pattern integration filter unit that detects, in a surrounding area of a pixel spaced apart from said each pixel by a distance corresponding to said stripe pattern foreground width at said each pixel in said image, a stripe pattern foreground upper end candidate pixel for which said stripe pattern background filter value satisfies a preset condition regarding a certain large-small relationship,
said stripe pattern integration filter unit detecting, in a surrounding area of a pixel spaced apart from said stripe pattern foreground upper end candidate pixel by a distance corresponding to said stripe pattern background width at said stripe pattern foreground upper end candidate pixel, a stripe pattern background upper end candidate pixel for which said stripe pattern background filter value satisfies a preset condition regarding a certain large-small relationship,
said stripe pattern integration filter unit setting a feature value, which is a result of a preset operation on stripe pattern foreground filter values at said each pixel and at said stripe pattern background upper end candidate pixel, and on a stripe pattern background filter value at said stripe pattern foreground upper end candidate pixel, to be a stripe pattern foreground/background filter feature value,
said stripe pattern integration filter unit setting a feature value, which is a result of a preset operation on said stripe pattern foreground width at said each pixel and on said stripe pattern foreground width at said stripe pattern background upper end candidate pixel, to be a stripe pattern foreground uniform width feature value;
said stripe pattern integration filter unit setting a feature value, which is a result of a preset operation on said stripe pattern foreground/background filter feature value and on said stripe pattern foreground uniform width feature value, to be said stripe pattern integration filter value; and
a stripe pattern area detection unit that checks, from a feature value calculated from said stripe pattern integration filter value in an area in said image, whether or not a stripe pattern is contained in said area;
said stripe pattern area detection unit outputting position information regarding an area in which said stripe pattern is contained as stripe pattern area information.

41. A method for detection of a stripe pattern comprising:
calculating, for each pixel in an image, feature values, each representing an increment of a pixel value in a surrounding area of said each pixel from pixel values outside of said surrounding area, as a size of said surrounding area is changed, finding, as a stripe pattern foreground filter value, such feature value out of said feature values that satisfies a preset condition regarding a certain large-small relationship, and finding a width of said surrounding area corresponding to said stripe pattern foreground filter value as being a stripe pattern foreground width;

calculating, for each pixel in said image, feature values, each representing a decrement of a pixel value in a surrounding area of said each pixel from pixel values outside of said surrounding area, as a size of said surrounding area is changed, finding, as a stripe pattern background filter value, such feature value out of said feature values that satisfies a preset condition regarding a certain large-small relationship, and finding a width of said surrounding area corresponding to said stripe pattern background filter value as being a stripe pattern background width;

detecting, in a surrounding area of a pixel spaced apart from said each pixel by a distance corresponding to said stripe pattern foreground width at said each pixel in said image, a stripe pattern foreground upper end candidate pixel for which said stripe pattern background filter value satisfies a preset condition regarding a certain large-small relationship;

detecting, in a surrounding area of a pixel spaced apart from said stripe pattern foreground upper end candidate pixel by a distance corresponding to said stripe pattern background width at said stripe pattern foreground upper end candidate pixel, a stripe pattern background upper end candidate pixel for which said stripe pattern background filter value satisfies a preset condition regarding a certain large-small relationship;

setting a feature value, which is a result of a preset operation on stripe pattern foreground filter values at said each pixel and at said stripe pattern background upper end candidate pixel, and on a stripe pattern background filter value at said stripe pattern foreground upper end candidate pixel, to be a stripe pattern foreground/background filter feature value;

setting a feature value, which is a result of a preset operation on said stripe pattern foreground width at said each pixel and on said stripe pattern foreground width at said stripe pattern background upper end candidate pixel, to be a stripe pattern foreground uniform width feature value;

setting a feature value, which is a result of a preset operation on said stripe pattern foreground/background filter feature value and on said stripe pattern foreground uniform width feature value, to be said stripe pattern integration filter value;

deciding, from a feature value calculated from said stripe pattern integration filter value in an area in said image, whether or not a stripe pattern is contained in said area; and outputting position information regarding an area in which said stripe pattern is contained as stripe pattern area information.

* * * * *